(12) United States Patent
Vasudev et al.

(10) Patent No.: US 9,197,513 B2
(45) Date of Patent: Nov. 24, 2015

(54) COMPUTER IMPLEMENTED METHODS AND APPARATUS FOR REPRESENTING A PORTION OF A USER INTERFACE AS A NETWORK ADDRESS

(71) Applicant: salesforce.com, inc., San Francisco, CA (US)

(72) Inventors: Gautam Vasudev, San Francisco, CA (US); Peng-Wen Chen, Foster City, CA (US); Reddy Prasad Yerradoddi, Fremont, CA (US); Brett Schuenemann, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 125 days.

(21) Appl. No.: 13/886,586

(22) Filed: May 3, 2013

(65) Prior Publication Data

US 2013/0346873 A1 Dec. 26, 2013

Related U.S. Application Data

(60) Provisional application No. 61/642,134, filed on May 3, 2012.

(51) Int. Cl.
*G06F 3/048* (2013.01)
*H04L 12/24* (2006.01)
*H04N 21/258* (2011.01)
*H04N 21/426* (2011.01)
*H04N 21/45* (2011.01)
*H04N 21/61* (2011.01)
*H04N 21/6402* (2011.01)

(52) U.S. Cl.
CPC .......... *H04L 41/22* (2013.01); *H04N 21/25808* (2013.01); *H04N 21/42684* (2013.01); *H04N 21/4516* (2013.01); *H04N 21/6125* (2013.01); *H04N 21/6402* (2013.01)

(58) Field of Classification Search
CPC ................ G06F 17/30864; G06F 13/4027
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — William Bashore
*Assistant Examiner* — Rayeez Chowdhury
(74) *Attorney, Agent, or Firm* — Weaver Austin Villeneuve & Sampson LLP

(57) ABSTRACT

Disclosed are methods, apparatus, systems, and computer-readable storage media for representing a portion of a user interface of a web browser as a web address. In some implementations, a computing device receives a request to encode as a web address a portion of a user interface provided in a web browser at the computing device. The computing device then generates a web address to identify content of the portion of the user interface. The portion of the user interface represented by the web address includes a primary user interface component and one or more secondary user interface components associated with the primary user interface component.

20 Claims, 14 Drawing Sheets

(56) References Cited

U.S. PATENT DOCUMENTS

| | | |
|---|---|---|
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Assal et al. |
| 7,945,653 B2 | 5/2011 | Zukerberg et al. |
| 8,005,896 B2 | 8/2011 | Cheah |
| 8,006,261 B1 * | 8/2011 | Haberman et al. ............... 725/34 |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,693,649 B2 | 4/2014 | Casalaina et al. |
| 8,718,241 B2 | 5/2014 | Casalaina et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0138616 A1 * | 9/2002 | Basson et al. .................. 709/225 |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 * | 4/2003 | Ramachandran et al. .... 715/513 |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |

(56) References Cited

U.S. PATENT DOCUMENTS

| | | |
|---|---|---|
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0143052 A1* | 6/2006 | Fotsch et al. .................. 705/3 |
| 2006/0206834 A1* | 9/2006 | Fisher et al. ................ 715/777 |
| 2006/0212514 A1* | 9/2006 | Saillet ......................... 709/203 |
| 2008/0082905 A1* | 4/2008 | Martinez et al. ............. 715/205 |
| 2008/0249972 A1 | 10/2008 | Dillon |
| 2009/0063415 A1 | 3/2009 | Chatfield et al. |
| 2009/0069000 A1* | 3/2009 | Kindberg et al. .......... 455/414.3 |
| 2009/0100342 A1 | 4/2009 | Jakobson |
| 2009/0177744 A1 | 7/2009 | Marlow et al. |
| 2009/0313212 A1* | 12/2009 | Aust ................................ 707/2 |
| 2010/0306653 A1* | 12/2010 | Wang et al. ................... 715/716 |
| 2011/0218958 A1 | 9/2011 | Warshavsky et al. |
| 2011/0247051 A1 | 10/2011 | Bulumulla et al. |
| 2012/0005572 A1* | 1/2012 | Rundle ......................... 715/235 |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0173720 A1 | 7/2013 | Vasudev et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0297863 A1* | 10/2014 | Zhu ............................... 709/225 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |

* cited by examiner

COMPUTER IMPLEMENTED METHODS AND APPARATUS FOR REPRESENTING A PORTION OF A USER INTERFACE AS A NETWORK ADDRESS

PRIORITY AND RELATED APPLICATION DATA

This application claims priority to U.S. Provisional Patent Application No. 61/642,134, filed on May 3, 2012, entitled METHODS AND SYSTEMS FOR PROVIDING CONSOLE BOOKMARKABLE URLS IN AN ON-DEMAND SERVICE ENVIRONMENT, by Vasudev, which is incorporated herein by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to on-demand services provided over a data network such as the Internet, and more specifically to a console application for accessing and interacting with information stored in the data network, for instance, in a database.

BACKGROUND

Organizations typically employ many different types of software and computing technologies to meet their computing needs. However, installing and maintaining software on an organization's own computer systems may involve one or more drawbacks. For example, when software must be installed on computer systems within the organization, the installation process often requires significant time commitments, since organization personnel may need to separately access each computer. Once installed, the maintenance of such software typically requires significant additional resources. Each installation of the software may need to be separately monitored, upgraded, and/or maintained. Further, organization personnel may need to protect each installed piece of software against viruses and other malevolent code. Given the difficulties in updating and maintaining software installed on many different computer systems, it is common for software to become outdated. Also, the organization will likely need to ensure that the various software programs installed on each computer system are compatible. Compatibility problems are compounded by frequent upgrading, which may result in different versions of the same software being used at different computer systems in the same organization.

Accordingly, organizations increasingly prefer to use on-demand services accessible via the Internet rather than software installed on in-house computer systems. On-demand services, often termed "cloud computing" services, take advantage of increased network speeds and decreased network latency to provide shared resources, software, and information to computers and other devices upon request. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

The included drawings are for illustrative purposes and serve only to provide examples of possible structures and process operations for the disclosed inventive systems, apparatus, methods and computer-readable storage media for representing a portion of a user interface in a web browser as a web address. These drawings in no way limit any changes in form and detail that may be made by one skilled in the art without departing from the spirit and scope of the disclosed implementations.

FIGS. 7 and 8 show images of examples of user interfaces that may be presented in a web browser at a client machine, in accordance with one or more implementations.

FIG. 12 shows an example of a graphical user interface (GUI) including a presentation of a primary user interface component and its associated secondary user interface components, in accordance with one or more implementations.

DETAILED DESCRIPTION

Figure 1:
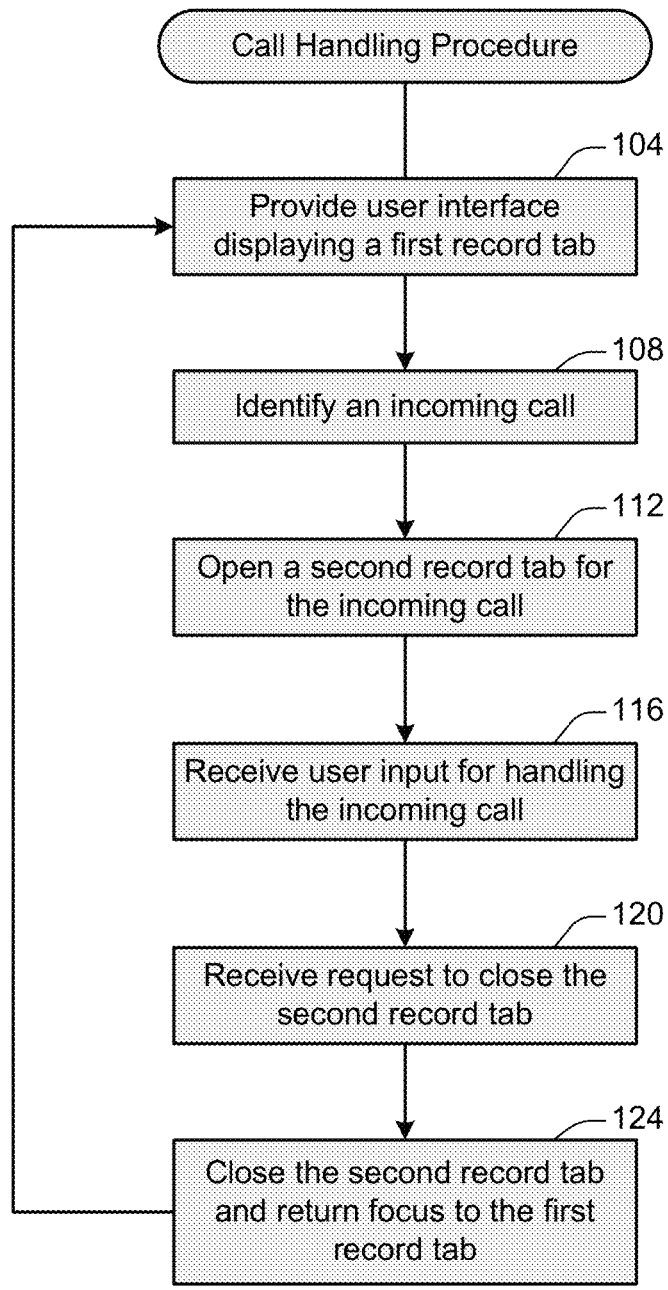
FIG. 1 shows a flowchart of an example of a method 100 for handling a call, performed in accordance with some implementations.

Applications of systems and methods according to one or more implementations are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosure, it is understood that these examples are not limiting, such that other implementations may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

Some implementations are directed to a user interface console provided at a client machine for interacting with object record information stored in a multitenant database at a server in an on-demand service environment. Some implementations of the apparatuses, systems and methods disclosed herein are adapted for use in other types of devices, systems or environments, as applicable, such that their use is applicable in broader applications than the environments and contexts described herein.

In the following figures, methods and apparatus applicable to various service cloud console configurations and their associated components are described. In one or more implementations, the service cloud console may be used to provide an on-demand, web-based system for accessing data and applications. The service cloud console (alternately described as the console, the console application, the agent console, or the service desk) includes a user interface provided at a client machine for interacting with object record information stored in storage facilities such as databases at a server.

In one or more implementations, an agent of an organization who is using an instance of a service cloud console application may receive a call from a client who has an account with the organization. Using the service cloud console application, the agent may open, close, edit, and/or save object records associated with the client's account.

Certain components and services of the service cloud console may be used to replace software for accessing data and managing customer records typically installed on separate computers in an organization. For example, the service cloud console may replace one or more customer relations management ("CRM") programs, call center programs, etc. By using the service cloud console, an agent for an organization can access data associated with a client of the organization.

Use of the service cloud console may be provided over data networks such as the Internet to a plurality of different organizations. The data network in which implementations of the service cloud console is implemented may include other wide area networks ("WAN") and local area networks ("LAN"), or portions thereof. In one or more implementations, different organizations may customize the service cloud console to suit their own needs. For example, an organization may create more than one console application, adjust the settings of a console application, apply a name to a console application, etc.

In one or more implementations, the service cloud console may include one or more graphical user interfaces tailored to maintain the context of an account using a tab metaphor. Examples of selected portions of such a graphical user interface according to one or more implementations are shown FIGS. 7-8. The service cloud console may be componentized such that each tab can display and/or refer to all or selected portions of groups of information. For example, a tab or component in the service cloud console may display all or selected portions of an individual row of data in a database, data integrated from an external system, or any other arrangement of data.

The system may be both easy for agents to use and easy for administrators to manage. One or more implementations may facilitate speed and simplicity, giving the agent the ability to navigate through the interface with a limited number of clicks, and without a great deal of training. One or more implementations may allow the agent to maintain the context, or frame of reference, of a current call and prior calls in an easily navigable interface. One or more implementations may allow the integration of external systems into a single, fluid agent interface. One or more implementations may improve access to a knowledge base, supplying the agent with the information he needs when he needs it.

In one or more implementations, certain components and services of the service cloud console may reduce the number of clicks an agent needed to make to perform a task. An agent's interaction with the console application is made as fast and as fluid as possible. Further, the console application maintains as much context as possible so the agent always knows what he's doing and where he's been in the console application.

The following several paragraphs describe use cases for two fictional individuals named Aaron and Bob. Aaron and Bob are agents who use call center software as part of their work. One or more implementations described herein may remedy one or more of the challenges faced by agents such as Aaron and Bob.

Aaron is a customer call center agent who is handling a telephone call from a customer. Aaron has opened a case record for the customer in a primary tab of a service cloud console as displayed in a user interface (UI) on Aaron's computing device. Aaron has also opened a number of secondary tabs corresponding to the customer's case record: a help article that Aaron looked up while assisting the customer and a billing record for the customer from separate billing database. After assisting the customer for some time, Aaron still does not have a solution to the customer's problem and would like to enlist the help of Bob, another customer call center agent, who may be able to solve the customer's problem. Aaron wants Bob to see the secondary records that he has opened during his research, so that Bob can quickly identify the problem that needs to be solved without having to re-do all of the research that Aaron has already done. In other words, Aaron would like to share the workspace that he has generated in the UI displayed on Aaron's computing device with Bob. However, Bob is sitting at another computer in another building.

Using some of the disclosed implementations, Aaron may prompt the service console to generate a bookmarkable URL, which is a web address that represents all of the object records mentioned above that are currently open in Aaron's workspace, and to send that bookmarkable URL to Bob via email, instant messaging, or social network messaging. When Bob opens the bookmarkable URL in his service console UI, the service console is configured to decode the bookmarkable URL, pull up appropriate object records, and display a copy of Aaron's workspace, complete with all of the records that Aaron had opened in his own workspace. The bookmarkable URL may include not only records that are stored on service console databases, but it may also include external web pages, such as an Internet web search, that Aaron opened in a sub-tab while researching the customer's problem.

Alternatively, if Aaron wishes to simply transfer the customer phone call to Bob, the service console application may also automatically package Aaron's workspace in a bookmarkable URL and include the bookmarkable URL in the call transfer to Bob. When Bob accepts the call transfer, Bob's computing device may then receive the bookmarkable URL, determine which object records need to be opened, query the server for those object records, and open the object records in Bob's user interface, presenting Bob with a copy of Aaron's workspace.

In another example, Aaron, after having performed all of the research for a customer, may wish to save and bookmark his workspace for later retrieval. Generating and saving a bookmarkable URL in his web browser gives Aaron an easy way to save his research for later use.

The disclosed implementations may improve communication among customer call agents of a customer call center and eliminate unnecessary duplicative work among multiple agents collaborating on a customer case.

User Interface Overview

Figure 7:
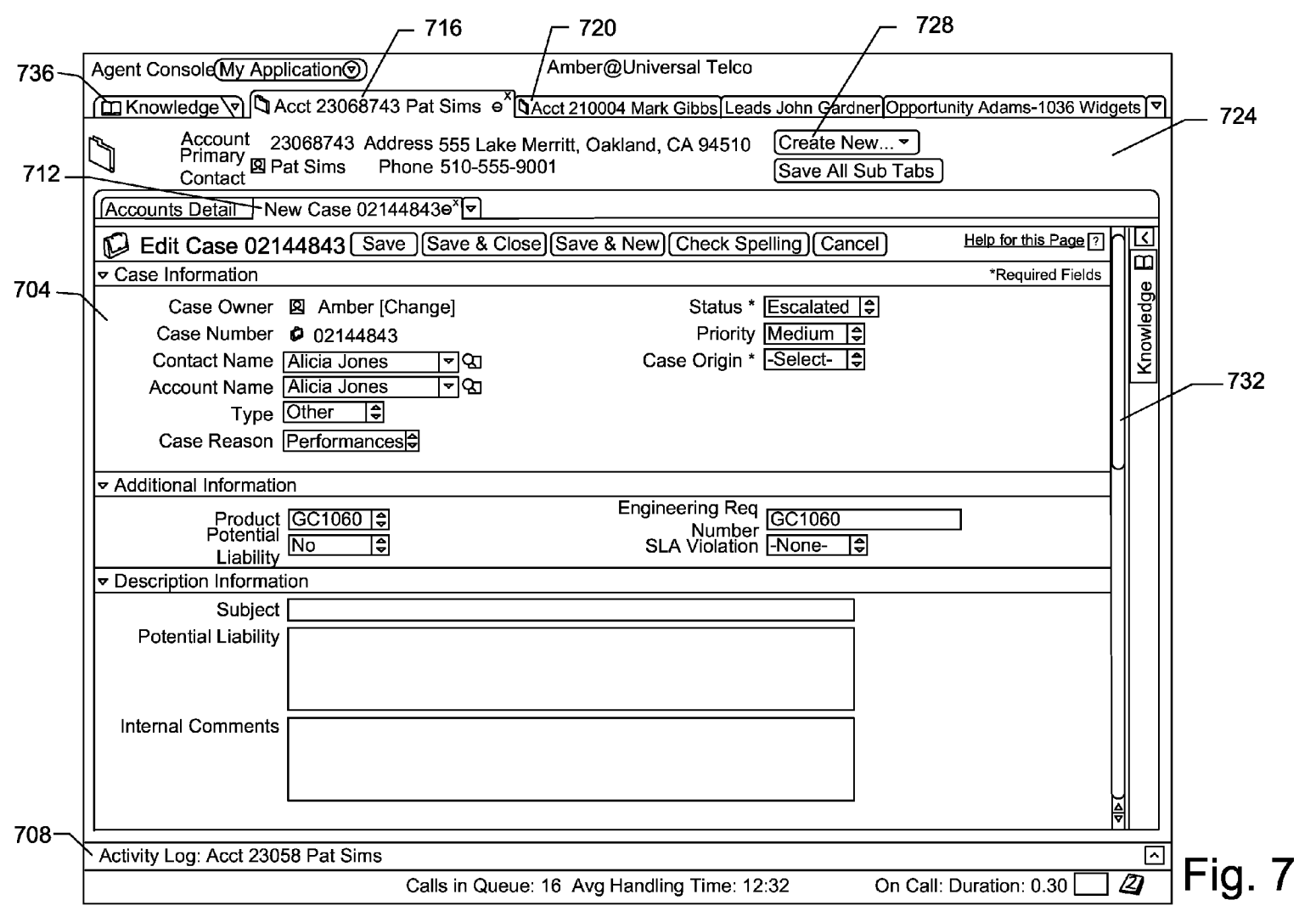
Figure 8:
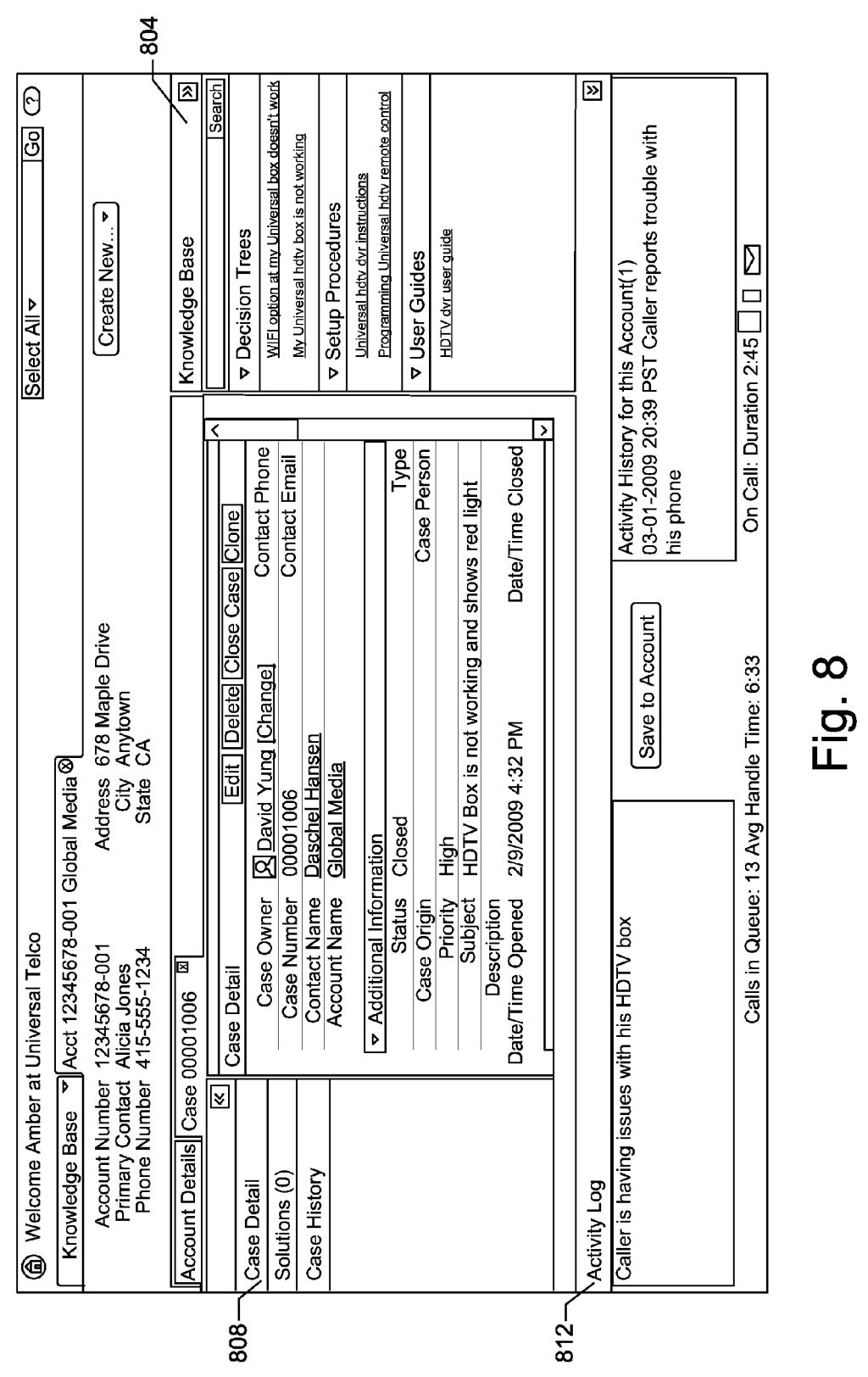

FIGS. 7 and 8 show images of examples of user interfaces that may be presented in a web browser at a client machine, in accordance with one or more implementations. Different implementations may include various user interfaces. For example, the user interface shown in FIG. 8 has a different appearance than the user interface shown in FIG. 7. Thus, the claims should not be construed as being limited to any particular user interface(s).

In one or more implementations, the user interface of the service cloud console may include one or more of an overview area, a main view area 704, a context view area 804, a sidebar area 808, a marquee area 708, and/or a highlights panel 724. The overview area may be a container in which components associated with the service cloud console, such as components 704, 708, 712, 716, 720, 724, 728, 732, and 736, are displayed. The overview area may show components that span a large set of information (e.g., a list view).

The main view 704 may show the detail or edit page of a single object or a search results page. The context view 804 may show small but editable views of objects that are related to the object in the main view. The sidebar 808 may be positioned on the side of the screen and may include an ability to handle a wide range of components. The marquee 708 may display a limited amount (e.g., one line) of informational text.

In some implementations, the main view 704 may display various information associated with one or more object records that are currently open as a primary tab (alternately referred to as a workspace) in the console application. The main view 704 may display one or more secondary tabs 712 that are each associated with the primary tab 716 that has focus in the console application. When a different primary tab (e.g., primary tab 720) is selected, then the one or more secondary tabs associated with the different primary tab may be displayed. The main view 704 may include a UI tool such as a vertical and/or horizontal scroll bar 732 to navigate the displayed page.

In one or more implementations, the main view 704 may rarely be overridden. For instance, search results and list views shown in the main view 704 may open new tabs rather than overriding the content of the main view 704 so that when the user navigates to an object, the results of the search are not lost. Similarly, sub-operations like creating tasks or sending emails may not override the content of the main view 704, but may use a technique such as an HTML <div> overlay to maintain context. The main view 704 may support inline editing.

The highlights panel 724 may include an area in the workspace (e.g., at the top) which gives the user information about the object controlling that workspace. A "mutton" 728 may be displayed in the highlights panel 724. The mutton 728 (alternately referred to as a multi-button) may be a button that acts as a dropdown menu containing multiple functions. The mutton 728 may allow the agent to perform actions that would normally be performed from buttons on related lists of the layout. The mutton 728 may include various buttons, which can be shown, for example, if the entity happens to be in a related list on the layout of the workspace entity, and if the button is shown in the layout for that related list.

One or more implementations may include a sidebar 808 that may be displayed on the side of the interface, as shown in FIG. 8. The sidebar 808 may be a separate layout such that there is a specific console sidebar component that is rendered in the console. The setup of the sidebar layout may be available in the console layout and may use concepts similar to that used for home page layouts.

In one or more implementations, when displaying a record in the main view area, the sidebar 808 may display one or more related lists, as shown in FIG. 8. The items displayed in the sidebar 808 may be navigated by a UI tool such as a vertical scroll bar if the number of items exceeds the vertical space. In certain situations, such as when a record is being edited, the sidebar 808 may be hidden.

The sidebar 808 may allow handling of various types of components, so it may include an interface (e.g., a tab or accordion widget) to manage these components effectively (e.g., displaying them without sending them below the fold of the page). The sidebar 808 may include a pluggable interface that has knowledge of the current context of the main page so that third parties can create custom sidebar components.

The marquee 708 may be a short area (e.g., one character high) that may be shown at the top and/or bottom of the screen. The marquee 708 may show fixed text and/or scrolling text. The direction of the scrolling text may depend on the agent's preferred language (e.g., right to left for user languages like English that are left-to-right, and left to right for languages like Hebrew that are right-to-left). The API may include a message object as a container for marquee messages. Message rows may count towards storage (e.g., in the database).

One or more implementations may include a control 736 referred to as a navigation tab (alternately referred to herein as Silvertab) which provides agents access to various objects without leaving the console. The navigation tab 736 can be configured by the administrator (alternately referred to as an admin) to access various available objects. In some implementations, only objects designated as navigation tab items for the console will be listed in the navigation tab menu. A default item can be selected from the chosen navigation tab items. On initial view of the console, the end user may see the navigation tab 736 in the top left region of the console with the default item name, color, and/or icon. In some implementations, the navigation tab 736 provides an approximately 150 px width space for icon and text. An item label that exceeds the available width (e.g., 150 px) may be truncated and appended with an ellipsis. In other implementations, the width space of the navigation tab may be a different size.

In some implementations, the overview area may display general overview information. The general overview information may be displayed using one or more list views, dashboards, or custom components. One or more implementations may include an activity log 1212 for entering information related to changes to the record, as shown in FIG. 8.

List views may include various capabilities, such as inline editing. When an object is clicked in the list view, it may raise an event that opens one or more tabs that pertain to that object. One or more list views may auto-update. For example, the list view may be configurable to auto-refresh at an interval (e.g., 5 minutes). One or more list views may be multi-sortable (e.g., an agent may be able to select multiple columns by which to sort). One or more list views may include hovers, a preview icon that can be clicked to show a hover, or both. One or more list views may include one or more visual indicators (e.g., indicating whether a new comment, email, or escalation has been added to a case). One or more list views may include a provision for mass actions.

One type of list view may be a universal inbox, which may contain a list of actionable items. This list may include (but is not limited to) new cases, leads, case comments, emails, tasks, and pending events. One advantage of the universal inbox is that it can show many different types of objects in one place and may allow users to prioritize them.

In one or more implementations, the overview area may be populable by draggable dashboard components. The overview area may be able to contain one or more of list views and/or dashboard components at the same time. A dashboard that is visible to a user may be available as a dashboard component.

In some implementations, one or more of these views may be collapsible. Collapsible views allow views to be hidden if the agent does not desire them there. The size of each of the views may be saved across sessions on a per-agent basis so that the agent does not have to re-layout his console every time he navigates to it.

The URL format of the service cloud console may be regular and/or bookmarkable. For instance, if an agent is viewing a case detail page, the agent may be able to copy that URL from the browser and email it to a colleague. When the colleague clicks on that URL, the corresponding case should appear in the main view of the colleague's console (even if the colleague's console is otherwise laid out differently).

FIG. 1 shows a flowchart of an example of a method 100 for handling a call, performed in accordance with some implementations. The call handling method 100 may be performed to facilitate the handling of a call by an agent using the service cloud console. For example, the call handling method 100 may be performed at a client machine in communication with a server. The client machine may be running a web browser displaying a user interface representing an instance of the service cloud console, such as the user interfaces shown in FIGS. 7 and 8.

In some implementations, one or more of the operations shown in FIG. 1 may be completed without refreshing the user interface or web page displayed in the web browser at the client machine in which the user interface is shown. Completing operations without refreshing the web page may allow the agent to receive calls and to open, edit, save, and close object records without significant interruptions.

At 104, a first record tab for accessing a first object record is provided. In one or more implementations, the first object record tab is provided in the user interface displayed in the web browser running at the client machine. An example of such a tab is shown at 716 in FIG. 7. The first object record tab may display information associated with the first object record. The first object record may be, for example, a database object stored in a database on the server.

For example, the first object record may be a client account, or a portion of a client account, such as the account shown on tab 716 in FIG. 7. The first object record tab may then contain information related to the client account, such as one or more names, phone numbers, e-mail addresses, or other contact information. Additionally, or alternately, the first object record tab may contain information such as billing data, technical data, client preferences, or any other type of information associated with the first object record in the database such as the case information shown in the main view 704 in FIG. 7.

Although one or more implementations display object records as tabs as user interface components, the user interface components for displaying object records are not limited to being displayed in tabs. According to various implementations, different types of user interface components may be used, such as window panes, windows, ribbons, 3D navigation environments, etc.

At 108, an incoming call is identified. The call may include any communication from an individual. In some instances, the call may be a communication from an individual associated with an account accessible via the service cloud console. For example, the call may be a communication from an individual associated with a customer of the organization using the service cloud console application.

In one or more implementations, the incoming call may be a voice call. The voice call may be a telephone call transmitted over a telephone network such as the public switched telephone network (PTSN), a voice over IP (VOIP) call received over a computer network, a pre-recorded voice call, or any other type of voice call. In some implementations, the incoming call may be another type of call, such as a text chat session, an e-mail, a text message, or any other type of communication.

In some implementations, identifying the incoming call may include identifying a number from which the call originated (e.g., a PSTN number, a VOIP number, etc.). Alternately, identifying the incoming call may include identifying a chat handle, a customer identification number, a URL, an e-mail address, or any other relevant identifier. However, in some instances the source of the incoming call may not be identified.

In one or more implementations, identifying the incoming call may include identifying an account associated with the incoming call. For example, a database at the server may be queried using a number associated with the incoming call to identify an account associated with the incoming call. In this case, the user interface may display information associated with the incoming call, such as the name of a client making the call, the name of an account associated with the client, or other information.

In one or more implementations, the incoming call may be received by the agent. For example, the incoming call may be received within the user interface displayed in the web browser by opening or activating a user interface component associated with receiving a call.

As a different example, the incoming call may be received via a different program or web page at the client machine. For example, the client machine may have dedicated software for receiving calls. Alternately, a separate user interface for receiving calls via a web browser may be displayed in a different tab or window of the web browser.

As yet another example, the incoming call may be received via a device other than the client machine, such as a telephone or headset. The telephone or headset may be communicatively coupled with one or both of the client machine or the server.

At 112, a second record tab for the incoming call is opened. When the second record tab is opened, the first record tab may be hidden from view. One method for opening a record is discussed with reference to FIG. 2.

In one or more implementations, a tab ordering including a listing of one or more previously accessed record tabs may be stored at the client machine. In this way, the focus of the user interface may be automatically returned to the previous record tab (e.g., the first record tab) when a subsequently accessed record tab (e.g., the second record tab) is closed.

In one or more implementations, the second record tab may be opened automatically. For example, when the incoming call is identified, a query may be transmitted to a database at the server to identify an object record associated with the incoming call. When the record is identified, the second record tab may then be opened automatically opened. Opening the second record tab automatically may save time for the agent because the agent need not manually look up the client's account. Instead, the client's account may already be open so that the agent has access to the account information when handling the call.

Alternately, the second record tab may be opened manually (e.g., by the agent). For example, the agent may identify a record to open after receiving the call and receiving information from the client. Manually opening the second record tab may be necessary if, for example, the client is calling from an unidentified source or a source not yet associated with the client's account. In this case, the agent may receive information from the client and then provide input to the user interface causing the identified object record to open.

In some instances, the second record tab may be associated with a new or blank object record. For example, the client may not be associated with an existing account, as may be the case for a new client. As another example, the client may be establishing a new record associated with an existing account.

At 116, user input for handling the incoming call is received. The user input may include any information for handling the incoming call, such as modifying account information for the client's account, adding new account information, establishing a new account for the client, deleting existing account information, updating or entering account preferences, etc.

In some instances, one or more additional procedures may be triggered during or after the receipt of the user input. For example, one or more instances of a contextual sidebar update method and/or an edited page detection method may be triggered. Examples of these methods are discussed with reference to FIGS. 5 and 6.

At 120, a request is received to close the second record tab. The request to close the second record tab may be received by detecting a click of a close button on a primary tab, such as the primary tab 116 shown in FIG. 7. In some instances, the received request may be an explicit request to close the second record tab. For example, the received request may be the detection of user input in the user interface such as clicking a "close" button or symbol, the detection of a keyboard command that corresponds with a request to close the tab, or any other technique for receiving an explicit request to close the second record tab.

In some instances, the received request may be an implicit request to close the second record tab. For example, the termination of the call may in some instances trigger a request to close the second record tab.

Figure 4:
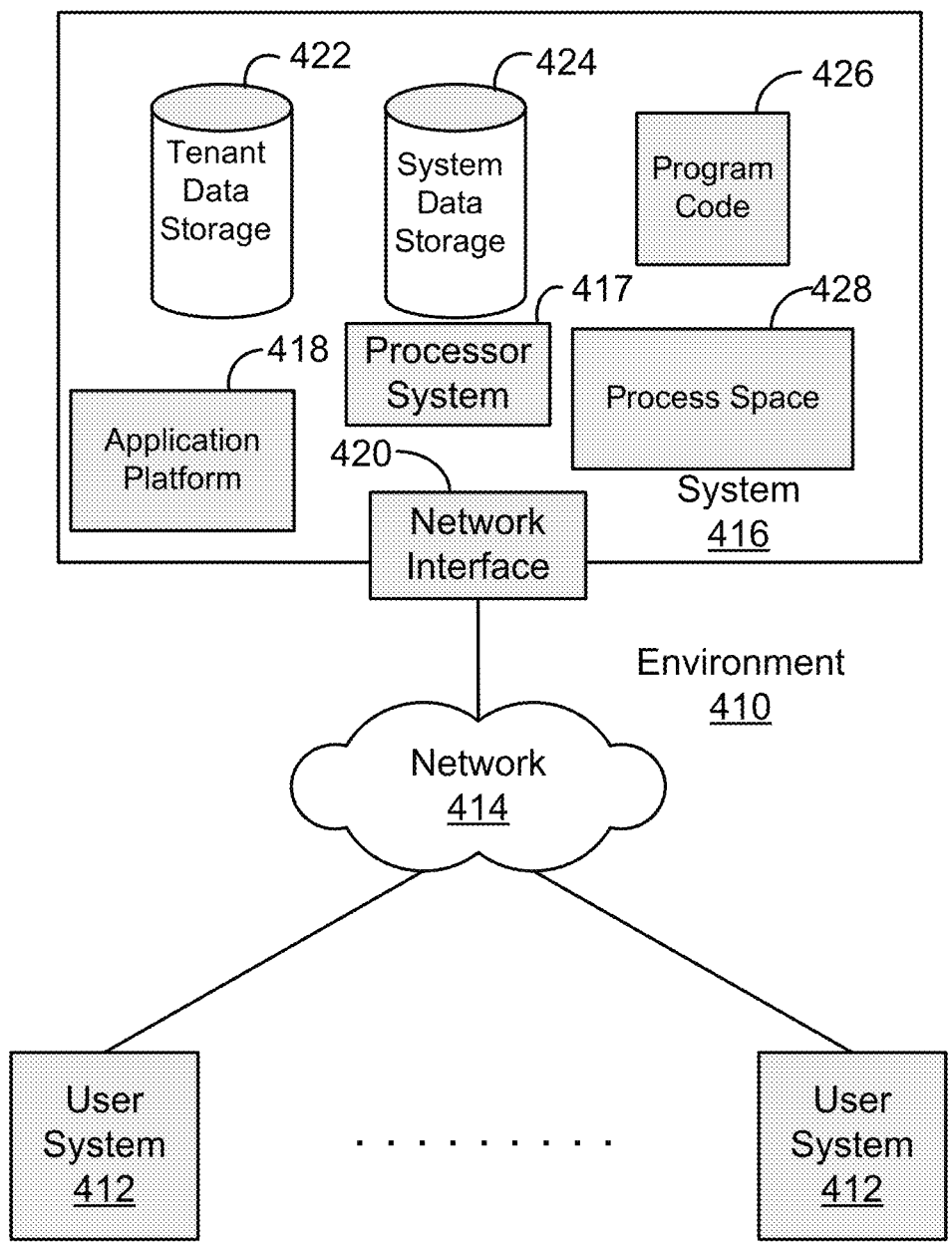
FIG. 4 shows a system diagram illustrating an example of the architecture of a multitenant database environment, in accordance with some implementations.

In one or more implementations, receiving a request to close the second record tab may trigger one or more procedures associated with ensuring that edited data is saved to the server, such as the edited page save method shown in FIG. 4.

At 124, the second record tab is closed. When the second record tab is closed, the second record tab may be removed from the user interface. Further, the first record tab may be revealed to the agent. Revealing the first record tab when the second record tab is closed may allow the agent to quickly resume interacting with the first record tab, thus reducing the interruption caused by receiving the call.

Figure 2:
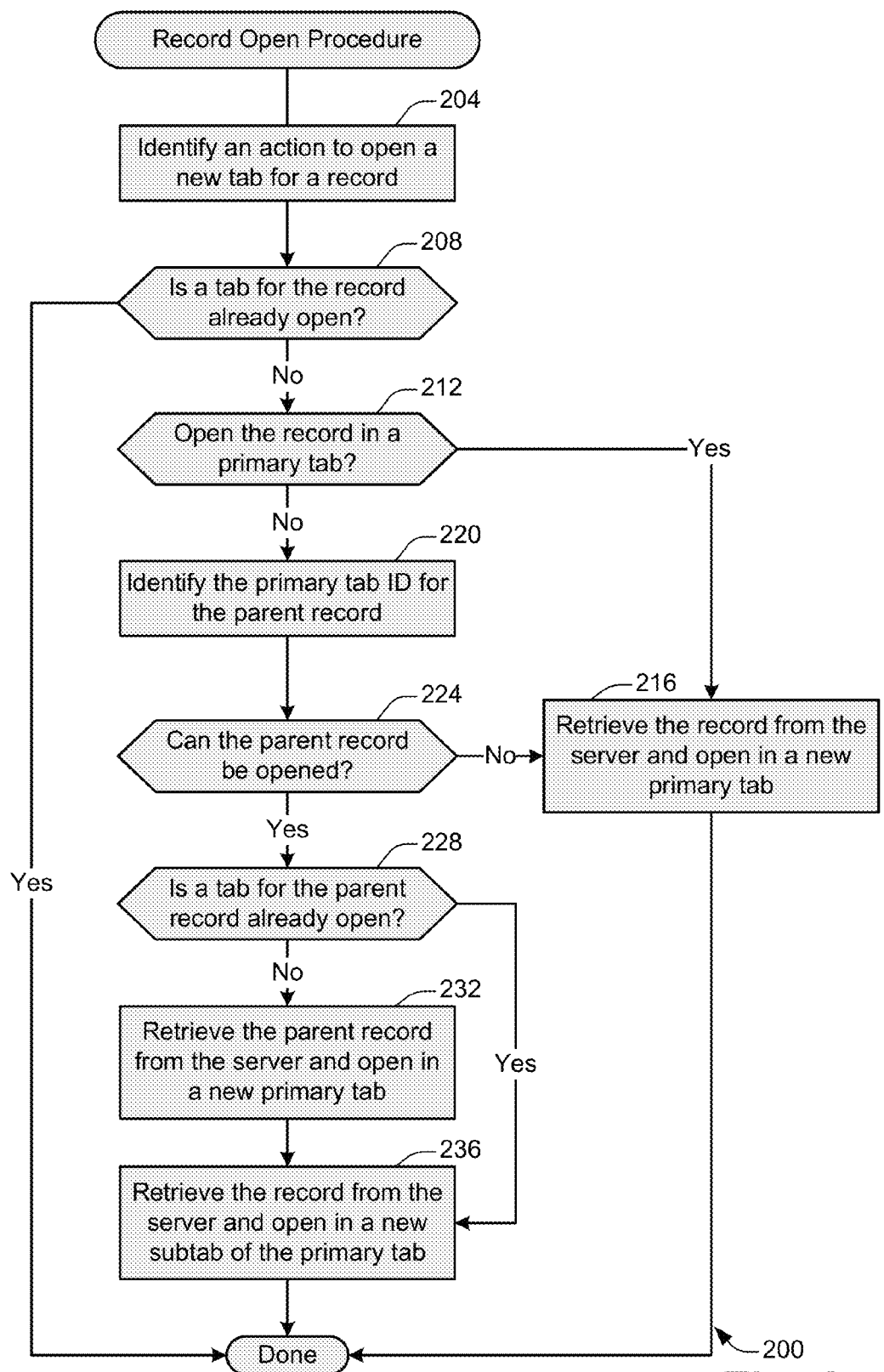
FIG. 2 shows a flowchart of an example of a method 200 for opening a record, performed in accordance with some implementations.

FIG. 2 shows a flowchart of an example of a method 200 for opening a record, performed in accordance with some implementations. The record open method 200 may be performed when the service cloud console user interface is displayed in a web browser at a client machine. The service cloud console interface may be open in a browser tab of a web browser or may be the only page open in the browser.

In one or more implementations, the service cloud console may display one or more user interface components for displaying object record information associated with object records stored in a database. Object records may include any database objects accessible via the service cloud console. In some implementations, these user interfaces may be arranged according to a tab metaphor, as is illustrated in the user interfaces shown in FIGS. 7-8. One or more implementations may use one or more different types of user interface components, such as windows, window panes, pages, wizard guides, list boxes, tree controls, etc. For example, one or more implementations may employ a "wizard-style" interface in which an agent is led through one or more tasks (e.g., using arrows). However, records are described herein as being displayed within tabs.

In one or more implementations, the service cloud console may display one or more primary tabs (alternately referred to as workspace tabs). As is shown in FIGS. 7 and 8, primary tabs may be arranged in a drag-and-drop user interface. The graphical user interface 700 shown in FIG. 7 includes a navigation tab 736 and primary tabs 716 and 720. The graphical user interface 700 also includes a highlights panel 724, a mutton 728, and an activity log 708. The record opened in the primary tab is displayed in the main view 704, and in FIG. 8, the graphical user interface 800 also includes a sidebar 808.

In one or more implementations, an individual primary tab may be closed using a close button. When an individual tab is closed, the last-viewed primary tab or the navigation tab may be brought into focus.

The graphical user interface shown in FIG. 7 includes a subtab bar 712. In one or more implementations, items or records other than the primary tab object opened within a primary tab may be displayed as subtabs in subtab bar 712. As with primary tabs, subtabs may be rearranged via a drag-and-drop interface, as shown in FIG. 7. However, one or more subtabs may be arranged in a fixed position. For example, the account detail page associated with the primary tab record may be fixed as the first subtab in the subtab bar 712, as shown in FIG. 7.

The operations shown in FIG. 2 illustrate a method for opening a record tab according to one or more implementations. The service cloud console may be operable to open and/or close record tabs without refreshing the web page in which the service cloud console user interface is displayed. Thus, an agent may open and/or close record tabs, which may include communications between the client machine and the server, without interrupting the user of the service cloud console.

At 204, an action to open a new tab for a record is identified. In some instances, the identified action may include an action taken by a user with the intention of opening a new record. For example, the identified action may be a mouse click or keyboard press indicating that a record should be open. In other instances, the identified action may include a condition or result that occurs in one or more processes. For example, a record may be automatically opened when a call is received.

In one or more implementations, the action to open a new tab may be identified in various ways. In some instances the action may be identified by determining user input using one or more client-side web technologies, such as HTML or JavaScript®, to detect user interaction with the user interface. In some instances, the action may be identified by receiving a message from the server (e.g., an HTTP message, an Ajax message, etc.). For example, the server may send a message to the browser indicating that a call is being routed to the client machine.

In some implementations, identifying the action to open a new tab for a record may include identifying the record itself. In some instances, an identifier for the record may be determined when the action is detected. For example, the identifier may be included in a link clicked by a user. In other instances, an identifier for the record may be determined based on cached information at the client and/or communication with the server.

At 208, a determination is made as to whether the record tab is already open. In some implementations, the determination may be made based on information at the client machine. For example, a list of open tabs may be maintained at the client machine, and an identifier associated with the identified record may be compared against that list.

In some implementations, the determination as to whether the record tab is already open may be made in cooperation with the server. For example, the server may query a database to determine an identifier associated with the record. As another example, the server may maintain a list of records opened at the client machine. The server may then return to the client an indication as to whether the record tab is already open.

At 212, a determination is made as to whether to open the record in a primary tab. In one or more implementations, a record (e.g., a database row) may be either a primary object (e.g., a workspace object) or a secondary object. For example, a customer account may be treated as a primary object, while a case may be treated as a secondary object.

The determination as to whether to open the record in a primary tab may be based upon whether the record represents a primary or workspaceable object (e.g., an account), or a secondary object associated with a primary object (e.g., a case associated with an account). When record is associated with a workspace object, the record may be termed a "child" of the workspace "parent" object.

If the record is a workspace object, such as a customer account, then the record may open in a primary tab. If instead the record is a secondary object that is associated with a workspace object, such as a case that is associated with a customer account, then the record may open in a secondary tab.

If the record is a secondary object that is not associated with a workspace object, such as a case for which an account has not yet been opened, then the record may open in a primary tab. If the record is a custom object that does not have an assigned category or association, then the record may open as a primary tab. If a custom record or other secondary object is opened in a primary tab, then the record's own highlight's panel layout may be used to display a highlights panel for the workspace.

In some implementations, the determination 212 may be made at the client machine. For example, the client machine may maintain information indicating certain record types that should open as primary or secondary tabs. In one or more implementations, the determination 212 may be made in conjunction with communication with the server. For example, the client machine may transmit to the server a record type and/or record identifier associated with the record. The server may then conduct a database query and then return an indication as to whether to load the record in a primary or secondary tab.

At 220, the primary tab ID for the parent record is identified. In some instances, the primary tab ID may be identified at the server, for example by querying a database after the record has been identified by the client machine. In other instances, the primary tab ID may be identified at the client machine, for example by consulting cached tab information stored at the client machine.

At 216, the record is retrieved from the server and opened in a new primary tab. Retrieving the record may involve one or more database queries to collect data and/or layout information for display in some or all of the user interface components that may be associated with a tab, including main view information, contextual information, overview panel information, etc. Since the record is opened as a primary tab, highlights panel information may also be retrieved.

The retrieved information is then transmitted from the server to the client machine. When the retrieved record information is received at the client machine, the client machine opens the record in a new primary tab. The client machine may change focus to the new tab in the user interface once the new tab is open. However, the context is maintained so that other tabs that were previously open may be selected.

At 224, a determination is made as to whether the parent record can be opened. The parent record may not be available for opening if, for example, the user lacks permission to open the parent record, the parent record does not exist, the parent record is invalid, etc. If the parent record is not available for opening, then the parent record may be opened in a new primary tab, as shown at 216.

In some instances, the determination as to whether the parent record can be opened may be made on the client machine. For example, if the primary tab ID for the parent record is null or otherwise invalid, then the client machine may determine that the parent record may not be opened without communicating with the server.

In some instances, the determination as to whether the parent record can be opened may be made on the server. For example, the server may determine whether the user has permission to open the parent record by comparing one or more permissions associated with the user's profile to one or more permissions required to open the parent record.

At 228, a determination is made as to whether the parent record tab is already open. In some implementations, the determination may be made based on information at the client machine. For example, a list of open tabs may be maintained at the client machine, and an identifier associated with the parent record may be compared against that list.

In some implementations, the determination as to whether the record tab is already open may be made in cooperation with the server. For example, the server may maintain a list of records opened at the client machine. The server may then return to the client an indication as to whether the parent record tab is already open.

At 232, the parent record is retrieved from the server and opened as a primary tab. Retrieving the parent record may involve one or more database queries to collect data and/or layout information for display in some or all of the user interface components that may be associated with a tab, including main view information, contextual information, overview panel information, etc. Since the parent record is opened as a primary tab, highlights panel information may also be retrieved.

The retrieved record information is then transmitted from the server to the client machine. When the retrieved record information is received at the client machine, the client machine opens the parent record in a new primary tab. The client machine may change focus to the new tab in the user interface once the new tab is open. However, the context is maintained so that other tabs that were previously open may be selected.

At 236, the record is retrieved from the server and opened in a new subtab of the primary tab. Retrieving the record may involve one or more database queries to collect data and/or layout information for display in some or all of the user interface components that may be associated with a tab, including main view information, contextual information, overview panel information, etc.

The retrieved record information is then transmitted from the server to the client machine. When the retrieved record information is received at the client machine, the client machine opens the record in a new subtab of the primary tab. The client machine may change focus to the new subtab in the user interface once the new subtab tab is open. However, the context is maintained so that other tabs that were previously open may be selected.

In one or more implementations, a record tab may include a tab label. A tab label may include information associated with the page, such as the name and/or type of page being opened. For example, an account record called Acme Systems may open with a tab labeled "Account: Acme Systems." As another example, tabs for external pages may be labeled as "External Page," since page titles currently may not be retrieved from HTML iframes. In some implementations, the tab label of a tab may change when the tab or a subtab changes (e.g., when a page is moved from detail mode to edit mode).

In one or more implementations, tab labels that exceed the tab size may be truncated. For example, excess characters may be replaced by an ellipsis. In some implementations, tabs may be dynamically resized according to the number of tabs in existence.

In one or more implementations, one or more of the operations shown in FIG. 2 may be performed at the client machine, at the server, or using a client/server combination. Where an operation is performed may be based on where information is located. For example, the client machine may maintain cached information that allows the client machine to perform one or more operations without communicating with the server. However, cached information may in some instances be insufficient to perform an operation without server interaction.

In some implementations, one or more of the operations shown in FIG. 2 may be performed in a different order than is shown. For example, two or more operations that involve communication between the client machine and server may be combined into fewer operations in order to reduce the burden on the server and/or reduce client-side delays caused by communicating with the server. For example, operations 212 and 216 may be combined into a single client-server interaction in some instances.

Figure 3A:
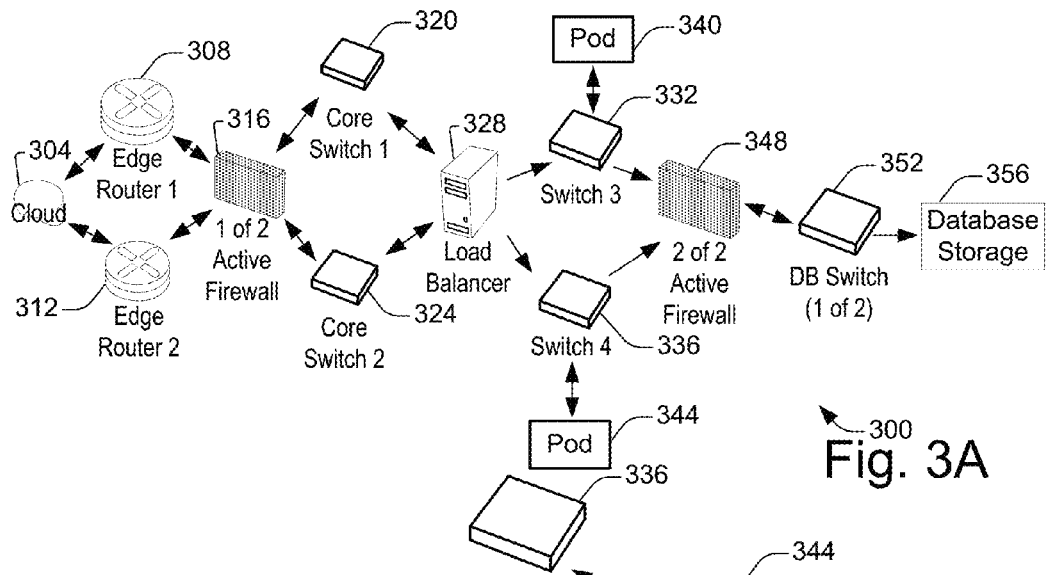
FIG. 3A shows a system diagram of an example of architectural components of an on-demand service environment, in accordance with some implementations.

FIG. 3A shows a system diagram of an example of architectural components of an on-demand service environment, in accordance with some implementations.

A client machine located in the cloud 304 (or Internet) may communicate with the on-demand service environment via one or more edge routers 308 and 312. The edge routers may communicate with one or more core switches 320 and 324 via firewall 316. The core switches may communicate with a load balancer 328, which may distribute server load over different pods, such as the pods 340 and 344. The pods 340 and 344, which may each include one or more servers and/or other computing resources, may perform data processing and other operations used to provide on-demand services. Communication with the pods may be conducted via pod switches 332 and 336. Components of the on-demand service environment may communicate with a database storage system 356 via a database firewall 348 and a database switch 352.

Figure 3B:
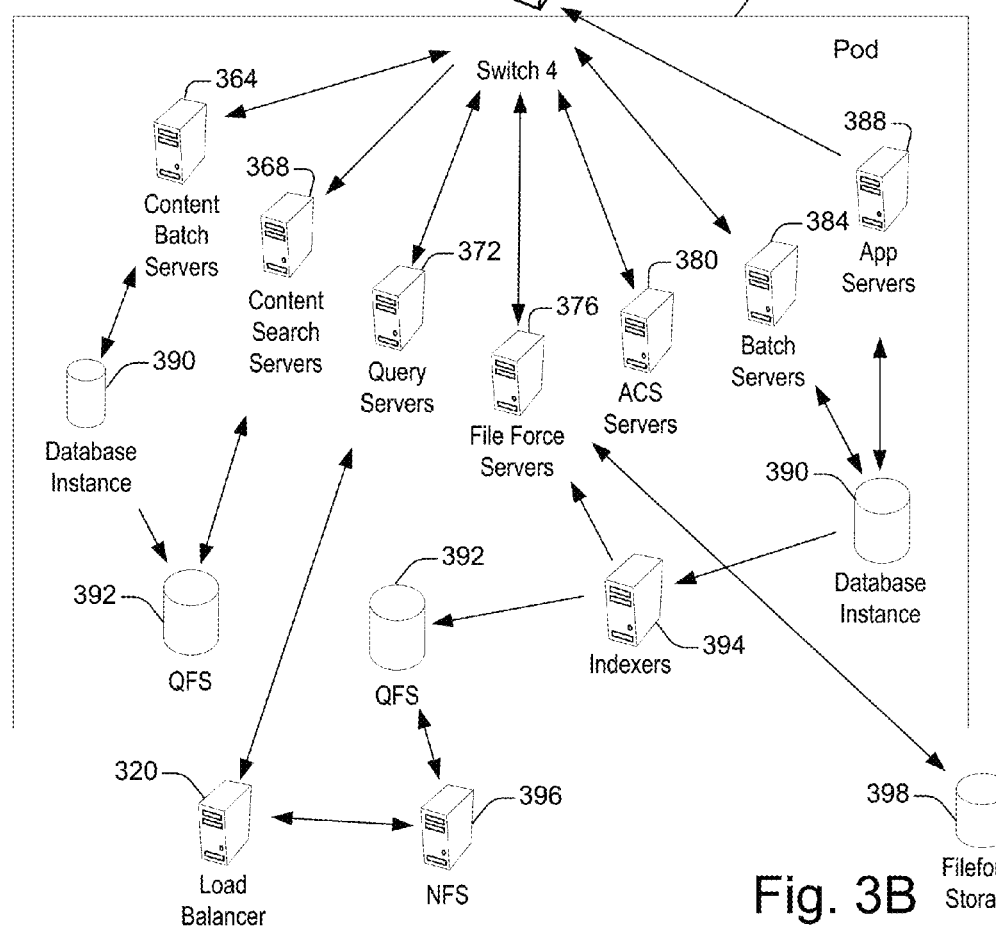
FIG. 3B shows a system diagram further illustrating an example of architectural components of an on-demand service environment, in accordance with some implementations.

As shown in FIGS. 3A and 3B, accessing an on-demand service environment may involve communications transmitted among a variety of different hardware and/or software components. Further, the on-demand service environment 300 is a simplified representation of an actual on-demand service environment. For example, while only one or two devices of each type are shown in FIGS. 3A and 3B, some implementations of an on-demand service environment may include anywhere from one to many devices of each type. Also, the on-demand service environment need not include each device shown in FIGS. 3A and 3B, or may include additional devices not shown in FIGS. 3A and 3B.

Moreover, one or more of the devices in the on-demand service environment 300 may be implemented on the same physical device or on different hardware. Some devices may be implemented using hardware or a combination of hardware and software. Thus, terms such as "data processing apparatus," "machine," "server", "computing device" and "device" as used herein are not limited to a single hardware device, but rather include any hardware and software configured to provide the described functionality.

The cloud 304 is intended to refer to a data network or plurality of data networks, often including the Internet. Client machines located in the cloud 304 may communicate with the on-demand service environment to access services provided by the on-demand service environment. For example, client machines may access the on-demand service environment to retrieve, store, edit, and/or process information.

In some implementations, the edge routers 308 and 312 route packets between the cloud 304 and other components of the on-demand service environment 300. The edge routers 308 and 312 may employ the Border Gateway Protocol (BGP). The BGP is the core routing protocol of the Internet. The edge routers 308 and 312 may maintain a table of IP networks or 'prefixes' which designate network reachability among autonomous systems on the Internet.

In one or more implementations, the firewall 316 may protect the inner components of the on-demand service environment 300 from Internet traffic. The firewall 316 may block, permit, or deny access to the inner components of the on-demand service environment 300 based upon a set of rules and other criteria. The firewall 316 may act as one or more of a packet filter, an application gateway, a stateful filter, a proxy server, or any other type of firewall.

In some implementations, the core switches 320 and 324 are high-capacity switches that transfer packets within the on-demand service environment 300. The core switches 320 and 324 may be configured as network bridges that quickly route data between different components within the on-demand service environment. In some implementations, the use of two or more core switches 320 and 324 may provide redundancy and/or reduced latency.

In some implementations, the pods 340 and 344 may perform the core data processing and service functions provided by the on-demand service environment. Each pod may include various types of hardware and/or software computing resources. An example of the pod architecture is discussed in greater detail with reference to FIG. 3B.

In some implementations, communication between the pods 340 and 344 may be conducted via the pod switches 332 and 336. The pod switches 332 and 336 may facilitate communication between the pods 340 and 344 and client machines located in the cloud 304, for example via core switches 320 and 324. Also, the pod switches 332 and 336 may facilitate communication between the pods 340 and 344 and the database storage 356.

In some implementations, the load balancer 328 may distribute workload between the pods 340 and 344. Balancing the on-demand service requests between the pods may assist in improving the use of resources, increasing throughput, reducing response times, and/or reducing overhead. The load balancer 328 may include multilayer switches to analyze and forward traffic.

In some implementations, access to the database storage 356 may be guarded by a database firewall 348. The database firewall 348 may act as a computer application firewall operating at the database application layer of a protocol stack. The database firewall 348 may protect the database storage 356 from application attacks such as structure query language (SQL) injection, database rootkits, and unauthorized information disclosure.

In some implementations, the database firewall 348 may include a host using one or more forms of reverse proxy services to proxy traffic before passing it to a gateway router. The database firewall 348 may inspect the contents of database traffic and block certain content or database requests. The database firewall 348 may work on the SQL application level atop the TCP/IP stack, managing applications' connection to the database or SQL management interfaces as well as intercepting and enforcing packets traveling to or from a database network or application interface.

In some implementations, communication with the database storage system 356 may be conducted via the database switch 352. The multi-tenant database system 356 may include more than one hardware and/or software components for handling database queries. Accordingly, the database switch 352 may direct database queries transmitted by other components of the on-demand service environment (e.g., the pods 340 and 344) to the correct components within the database storage system 356.

In some implementations, the database storage system 356 is an on-demand database system shared by many different organizations. The on-demand database system may employ a multi-tenant approach, a virtualized approach, or any other type of database approach. An on-demand database system is discussed in greater detail with reference to FIGS. 4 and 5.

FIG. 3B shows a system diagram further illustrating an example of architectural components of an on-demand service environment, in accordance with some implementations. The pod 344 may be used to render services to a user of the on-demand service environment 300.

In some implementations, each pod may include a variety of servers and/or other systems. The pod 344 includes one or more content batch servers 364, content search servers 368, query servers 372, file force servers 376, access control system (ACS) servers 380, batch servers 384, and app servers 388. Also, the pod 344 includes database instances 390, quick file systems (QFS) 392, and indexers 394. In one or more implementations, some or all communication between the servers in the pod 344 may be transmitted via the switch 336.

In some implementations, the application servers 388 may include a hardware and/or software framework dedicated to the execution of procedures (e.g., programs, routines, scripts) for supporting the construction of applications provided by the on-demand service environment 300 via the pod 344. Some such procedures may include operations for providing the services described herein.

The content batch servers 364 may requests internal to the pod. These requests may be long-running and/or not tied to a particular customer. For example, the content batch servers 364 may handle requests related to log mining, cleanup work, and maintenance tasks.

The content search servers 368 may provide query and indexer functions. For example, the functions provided by the content search servers 368 may allow users to search through content stored in the on-demand service environment.

The Fileforce servers 376 may manage requests information stored in the Fileforce storage 378. The Fileforce storage 378 may store information such as documents, images, and basic large objects (BLOBs). By managing requests for information using the Fileforce servers 376, the image footprint on the database may be reduced.

The query servers 372 may be used to retrieve information from one or more file systems. For example, the query system 372 may receive requests for information from the app servers 388 and then transmit information queries to the NFS 396 located outside the pod.

The pod 344 may share a database instance 390 configured as a multi-tenant environment in which different organizations share access to the same database. Additionally, services rendered by the pod 344 may require various hardware and/or software resources. In some implementations, the ACS servers 380 may control access to data, hardware resources, or software resources.

In some implementations, the batch servers 384 may process batch jobs, which are used to run tasks at specified times. Thus, the batch servers 384 may transmit instructions to other servers, such as the app servers 388, to trigger the batch jobs.

In some implementations, the QFS 392 may be an open source file system available from Sun Microsystems® of Santa Clara, Calif. The QFS may serve as a rapid-access file system for storing and accessing information available within the pod 344. The QFS 392 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 368 and/or indexers 394 to identify, retrieve, move, and/or update data stored in the network file systems 396 and/or other storage systems.

In some implementations, one or more query servers 372 may communicate with the NFS 396 to retrieve and/or update information stored outside of the pod 344. The NFS 396 may allow servers located in the pod 344 to access information to access files over a network in a manner similar to how local storage is accessed.

In some implementations, queries from the query servers 322 may be transmitted to the NFS 396 via the load balancer 320, which may distribute resource requests over various resources available in the on-demand service environment. The NFS 396 may also communicate with the QFS 392 to update the information stored on the NFS 396 and/or to provide information to the QFS 392 for use by servers located within the pod 344.

In some implementations, the pod may include one or more database instances 390. The database instance 390 may transmit information to the QFS 392. When information is transmitted to the QFS, it may be available for use by servers within the pod 344 without requiring an additional database call.

In some implementations, database information may be transmitted to the indexer 394. Indexer 394 may provide an index of information available in the database 390 and/or QFS 392. The index information may be provided to file force servers 376 and/or the QFS 392.

FIG. 4 shows a system diagram illustrating an example of the architecture of a multitenant database environment, in accordance with some implementations.

Figure 5:
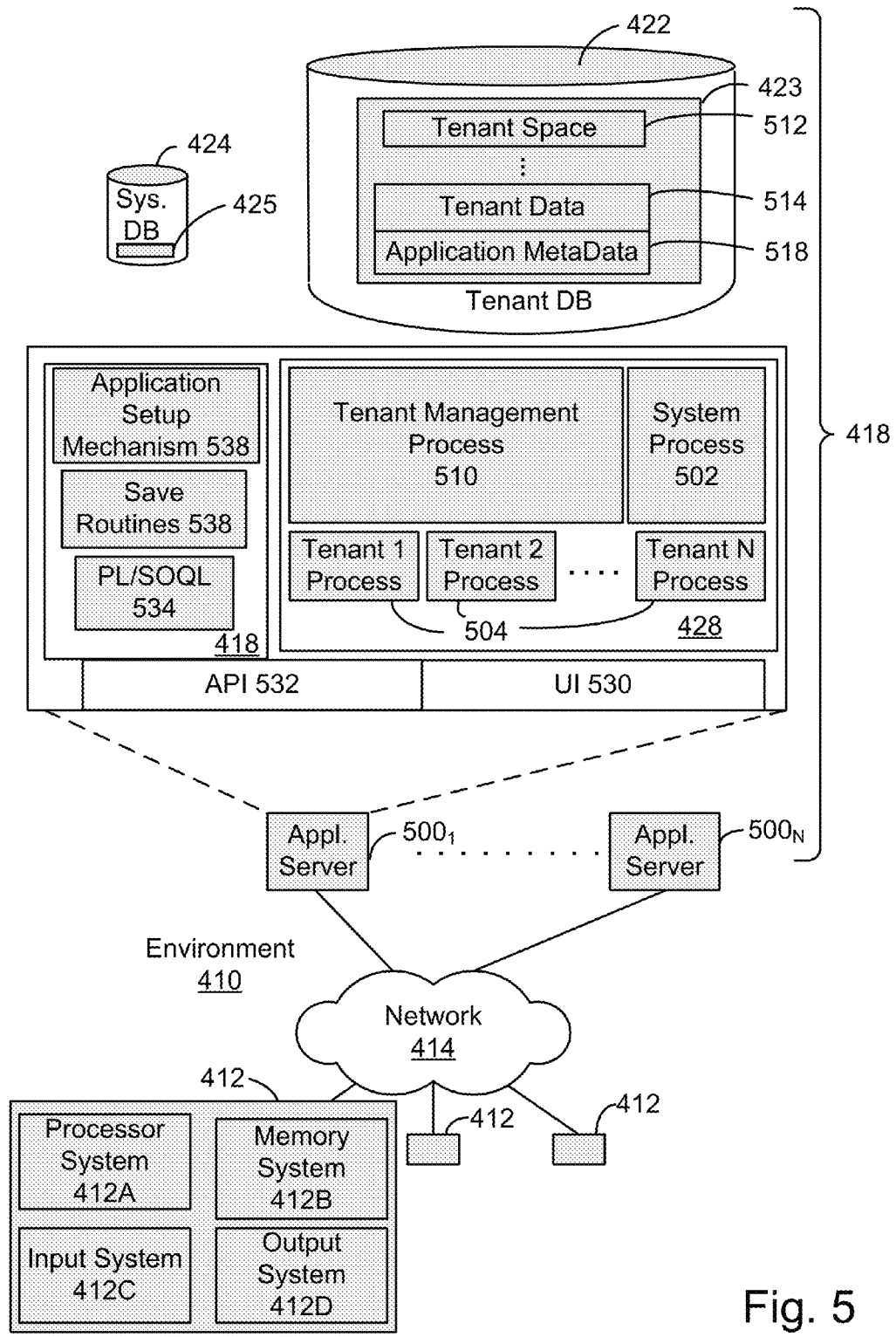
FIG. 5 shows a system diagram further illustrating an example of the architecture of a multitenant database environment, in accordance with some implementations.

Environment 410 includes an on-demand database service 416. User system 412 may be any client machine or system that is used by a user to access a database system. For example, any of user systems 412 can be a handheld computing device, a mobile phone, a laptop computer, a work station, and/or a network of computing devices. As illustrated in FIGS. 4 and 5, user systems 412 might interact via a network 414 with the on-demand database service 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS).

Accordingly, "on-demand database service 416" and "system 416" will be used interchangeably herein. A database image may include one or more database objects. A relational database management system (RDBMS) or the equivalent may execute storage and retrieval of information against the database object(s). Application platform 418 may be a framework that allows the applications of system 416 to run, such as the hardware and/or software, e.g., the operating system. In an implementation, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

The users of user systems 412 may differ in their respective capacities, and the capacity of a particular user system 412 might be entirely determined by permissions (permission levels) for the current user. For example, where a call center agent is using a particular user system 412 to interact with system 416, the user system 412 has the capacities allotted to that call center agent. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some implementations are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one implementation, system 416, shown in FIG. 4, implements a web-based customer relationship management (CRM) system such as the service cloud console. For example, in one implementation, system 416 includes application servers configured to implement and execute CRM software applications as well as provide related data, code, forms, web pages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain implementations, system 416 implements applications other than, or in addition to, a CRM application. For example, system 416 may provide tenant access to multiple hosted (standard and custom) applications. User (or third party developer) applications, which may or may not include CRM, may be supported by the application platform 418, which manages creation, storage of the applications into one or more database objects and executing of the applications in a virtual machine in the process space of the system 416.

Each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414.

Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, implementations are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one implementation, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units.

A computer program product implementation includes a machine-readable storage medium (media) having instructions stored thereon/in which can be used to program a computer to perform any of the processes of the implementations described herein. Computer code for operating and configuring system 416 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing implementations can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to one implementation, each system 416 is configured to provide web pages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 5 shows a system diagram further illustrating an example of the architecture of a multitenant database environment, in accordance with some implementations. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers 5001-500N, system process space 502, tenant process spaces 504, tenant management process space 510, tenant storage area 512, user storage 514, and application metadata 516. In other implementations, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of processors. Memory system 412B may be any combination of one or more memory devices, short term, and/or long term memory. Input system 412C may be any combination of input devices, such as keyboards, mice, trackballs, scanners, cameras, and/or interfaces to networks. Output system 412D may be any combination of output devices, such as monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as Oracle™ databases.

Application platform 418 includes an application setup mechanism 538 that supports application developers' creation and management of applications, which may be saved as metadata into tenant data storage 422 by save routines 536 for execution by subscribers as tenant process spaces 504 managed by tenant management process 510 for example. Invocations to such applications may be coded using PL/SOQL 34 that provides a programming language style interface extension to API 532. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server 500₁ might be coupled via the network 414 (e.g., the Internet), another application server 500N-1 might be coupled via a direct network link, and another application server 500N might be coupled by yet a different network connection. Transfer Control Protocol and Internet Protocol (TCP/IP) are typical protocols for communicating between application servers 500 and the database system. However, other transport protocols may be used to optimize the system depending on the network interconnect used.

In certain implementations, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one implementation, therefore, an interface system implementing a load balancing function (e.g., an F5 Big-IP load balancer) is communicably coupled between the application servers 500 and the user systems 412 to distribute requests to the application servers 500. In one implementation, the load balancer uses a least connections algorithm to route user requests to the application servers 500. Other examples of load balancing algorithms, such as round robin and observed response time, also can be used. For example, in certain implementations, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each call center agent uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain implementations, user systems 412 (which may be client machines/systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. In some implementations, multiple "tables" for a single customer may actually be stored in one large table and/or in the same table as the data of other customers.

Figures 6A, 6B:
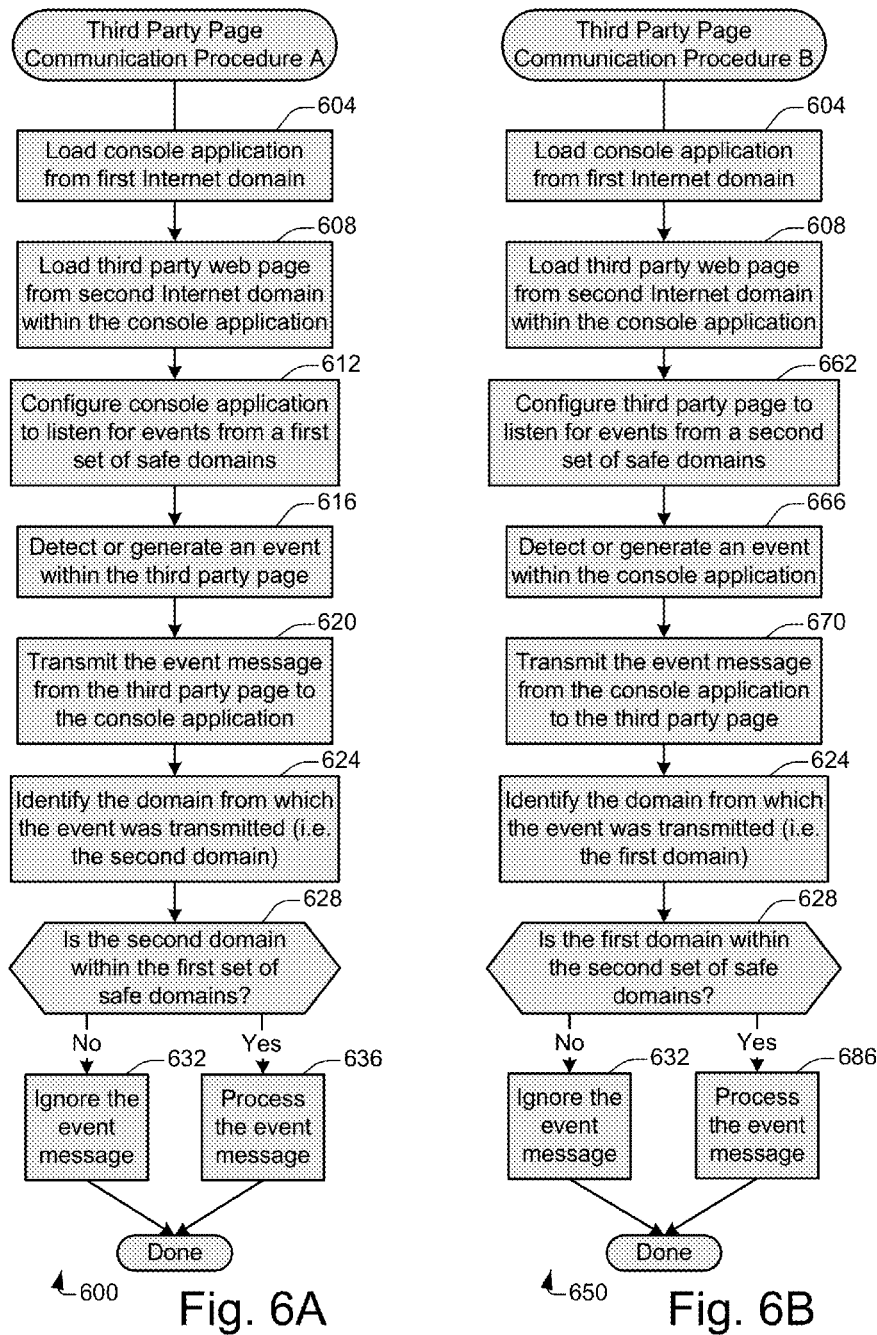
FIGS. 6A and 6B show flowcharts of examples of methods illustrating interactions of third party pages with the service cloud console environment, in accordance with one or more implementations.

The implementations disclosed herein may include a cross-domain API situated at a client machine that allows pages served from external domains to perform certain actions, such as exchanging information with one another, within a web browser program running on the client machine. These pages may be referred to as "third party pages." FIGS. 6A and 6B show flow diagrams illustrating interactions of third party pages, in accordance with one or more implementations. In one or more implementations, this cross-domain API may be referred to as a service cloud console integration toolkit.

Call centers that use the service cloud console may have integrations to third party systems, such as billing systems, shipping systems, accounting systems, etc. The service cloud console may provide an interface that allows agents access to one or more of these applications. In some implementations, one or more of these third party applications may participate in the tabbed model provided through the service cloud console.

Because communication between frames from different domains presents a security risk within the browsers, this functionality is explicitly restricted in some modern browsers. In other modern browsers, however, cross-domain communication has been addressed, for instance, in HTML 5 (available from W3.org at http://www.w3.org/TR/htm15/comms.html) with the postMessage framework. However, HTML 5 is currently supported in only a limited number of browsers, such as Internet Explorer 8, Firefox 3, and Opera 9.

In some implementations, the cross-domain API may be used to facilitate integration with third party pages within Salesforce.com® itself. For example, VisualForce™ pages may be served from a different domain than the service cloud console.

Given the potential security concerns, it may be desirable to avoid exposing the ability for a third-party domain to directly perform data manipulation. For example, in Salesforce.com® it may be possible to open an edit page, make modifications to an object, and save it, all by opening a single URL with a set of parameters in the query string. However, this type of operation may not be permitted by the cross-domain API, as it could open up a means for attackers to modify data without the user's knowledge or consent.

The third party page communication methods shown in FIGS. 6A and 6B may be used to facilitate secure cross-domain communication. These methods may be run in a web browser at a client machine in communication with one or more servers that provide data to the browser. However, some or all of the individual processing steps shown in FIGS. 6A and 6B may be performed without communication with the server. Thus, cross-domain communications may be facilitated without requiring the additional latency or computational burdens that would exist if cross-domain communications were accomplished using a proxy or other type of server communication.

In one implementation, in 604, a service cloud console application from the data provider is loaded from a first domain, such as www.salesforce.com. The console application may be loaded by sending instructions from one or more data provider servers hosting the first domain to a web browser at a client machine. When the console application is loaded, records served from the first domain may be visible in the console application. For example, one or more records may be opened using a record open method, as shown in FIG. 2.

In 608, a third party web page is loaded from a second domain, for instance, from phone system 68, in a portion of a user interface also displaying the console application. In some implementations, the third party web page may be loaded as a primary or secondary tab within the console application. The third party web page may also be automatically loaded in response to receiving data from the console application. For example, a first object record may include a link to accounting information visible through a third party web page. When the link is clicked, the third party web page is loaded.

In some implementations, the first domain is controlled by a data provider, e.g., Salesforce.com®, while the second domain may be controlled by a different entity, such as the phone provider. For example, the console application may be loaded from a first domain controlled by Salesforce.com®, while the third party page is loaded from a second domain controlled by a third party service provider unaffiliated with the service provider controlling the first domain In 612, the console application is configured to listen to events from a first set of safe domains. The first set of safe domains identifies the one or more trusted domains from which the console application may safely accept cross-domain messages. In some implementations, the first set of safe domains may be limited to a particular group of domains, such as those provided by the data provider of the console application. The first set of safe domains may also include domains identified as trusted, such as the second domain associated with a third party service provider system.

In some implementations, wildcards may be used to identify groups of domains using a single string. For example, the first set of safe domains may include domains such as na1.force.com, *.na2.force.com, and/or *.sales force.com.

In 616, the third party page may detect or generate an event of some type, such as the receipt of phone event information from some source, as described above. The detected event may include any type of occurrence that causes cross-domain communication. In some implementations, the event may be a scripting event triggered directly by a user action, such as clicking a link or button within the third party page. Alternately, or additionally, the event may be generated by code running within the third party page that identifies a triggering condition.

In 620, the event triggers a message that is sent to the console application. The message may include a JavaScript® event message, or other type of event message. The message may be sent to a JavaScript® Event Listener operating in the console application served from the first domain. Alternately, or additionally, a different type of scripting language may be used, such as VBScript.

When the event message is received, the console application identifies the domain from which the event message was sent (i.e. the second domain), as shown at 624. The domain may be identified by retrieving a value associated with the event message. After the second domain is identified as the source of the event, the second domain is compared to the first set of safe domains, as shown at 628.

As shown at 632, if the second domain is not within the first set of safe domains, then the message is ignored. In this case, the second domain has not been identified as a "safe" domain from which to receive messages. By only accepting messages sent from an identified subset of domains, the security risks inherent in cross-domain communications may be mitigated.

In some implementations, receiving a cross-domain event message from a third party domain not in the first set of safe domains may cause one or more security or logging actions to be taken. For example, the event message may be logged in a security record to help identify unauthorized attempts to access the service cloud console application.

As shown at 636, the event message is processed if the second domain is within the first set of safe domains. The event message may be processed according to one or more event handlers in the console application.

In some implementations, even domains included in the first set of safe domains may be limited to triggering particular actions or types of actions within the console application, in order to provide further protection against unauthorized access. Examples of such actions are discussed below. However, different implementations may allow various actions or types of actions in response to an event message.

Regardless of whether the event message is processed, the service cloud console may continue monitoring for additional messages transmitted from third party domains. Continual monitoring for cross-domain event messages may be accomplished using, for example, an Observer design pattern. Thus, the third party page may be able to send messages to the service cloud console, while the security of the console application is maintained.

FIG. 6B shows a complementary third party page communication method B for transmitting messages from the console application to a third party page. The method shown in FIG. 6B is similar to the method shown in FIG. 6A in some respects, with like reference numerals indicating like operations.

In some implementations, a different set of safe domains may be identified at 662 than at 612. For example, the second set of safe domains may be limited to domains associated with the service cloud console (e.g., *.force.com, *.salesforce.com), while the first set of safe domains may include one or more domains associated with third party service providers. By using different sets of safe domains, the security of the third party pages may be maintained because the third party pages may not be operable to communicate with each other.

In 666, an event within the console application is detected, similar to 616. In 670, an event message from the console application is communicated to the third party page, similar to 620. In some implementations, a different set of actions or types of actions may be allowed in response to receiving an event message from an accepted domain, as shown at 686. In both figures, the set of allowable actions or types of actions may be strategically determined based on security concerns and the type of cross-domain communication that is needed to facilitate integration.

In some implementations, the methods shown in FIGS. 6A and 6B may be performed concurrently, thus allowing for secure cross-domain two-way communication between the console application and the third party page. Alternately, one of the methods shown in FIGS. 6A and 6B may be omitted so that only one-way cross-domain communication is allowed.

The cross-domain API is described with reference to a pseudocode implementation according to some implementations. However, the pseudocode is provided only as an example, and some implementations may employ a different implementation. For example, cross-domain API methods may be specified using some methods, method names, parameters, and/or parameter names (e.g., method(parameter1:type, parameter2:type):returntype). However, different methods, method names, parameters, and/or parameters names may be used in different implementations. As another example, at least part of the cross-domain API pseudocode here may appear as methods that return values synchronously. However, some implementations may include one or more methods that return values asynchronously (e.g., via a callback method).

Developers may be able to import one or more libraries into various pages, but some methods within these libraries may be prevented from operating unless the pages are run in a designated context.

Third party pages may have the ability to open primary tabs, subtabs, or both. Primary tabs and subtabs opened from third party pages may follow navigation rules similar to standard pages. For example, duplicate pages may not be allowed by default. However, developers may be permitted to allow duplicate pages. As another example, third party pages may behave with back, forward, and/or refresh buttons in a manner similar to standard pages.

A page may only be able to manipulate itself and the tabs which it has opened itself. If a VisualForce™ page is embedded on a standard page, it may be able to manipulate the tab in which it is contained.

Workspace Objects

This section describes properties of workspace objects in one or more implementations.

In one or more implementations, an administrator may map a field on an object to a workspaceable object using a workspace driver field. When an object has a field configured in this way, it may become a subordinate object. In this case, the object may only open in the workspace of the object to which it is subordinate. Each object may be limited to one workspace driver field.

For example, one custom object may be a bill. A bill may have fields such as amount (a currency), account (a lookup to account), and contact (a lookup to contact). One of these fields, or the bill itself, may be the workspace driver. If account is set as the workspace driver field, then when opening a bill, the account will appear in the workspace tab, and the bill will appear as a subtab.

In one or more implementations, almost any object may be a workspace object. A workspace driver field may be used to define what workspace an object will open in if not its own. Those driver fields may be selectable from the set of lookup relationships on a given object. Any of an object's relationships may be available in this list.

Despite the existence of a workspace driver field, an object may open in its own workspace if it happens to be orphaned. For example, a case object may be configured such that the parent account is its workspace object, but the user may open a case which is orphaned, (i.e. its parent account is null). In this event, the case may open in its own workspace, even though under normal circumstances cases don't do so.

In one or more implementations, each objects have a highlights panel layout. If no highlights panel is defined for an object, its mini view layout may be used by default. This layout may be specified by the same mechanism used by the "deal view."

In one or more implementations, only non-setup entities may be included in the metadata allowing end users to choose their workspace properties. Setup entities like user may implicitly be configured as "Opens In Itself."

In one or more implementations, VisualForce™ pages may be configurable as workspaceable pages or as subordinate objects. In the event that a VisualForce™ page is workspaceable, it may be allowed to omit the highlights panel.

In one or more implementations, objects selected from a subtab may stay within the context of that workspace. For example, suppose contact is a workspaceable object and an account is open. A contact opened from the account details section may open as a subtab under the account and not in its own contact workspace. Even though contact is a workspaceable object, it may be opened in the context of an account. In some implementations, a user may drag the contact tab up to workspace bar to make it its own workspace and/or drag one or more workspaces into subtabs.

The URL Bar and the Default Tab

One or more implementations may include one or more default tabs. This section describes functionality associated with the URL Bar and default tab in one or more implementations.

When a user first navigates to the service cloud console, Console may navigate to the default tab.

When navigating to a Salesforce.com® page outside of the console, the app specified in the app selector may remain "Service Cloud Console," and the only tab displayed may be "Return To Service Cloud Console."

An attempt to navigate to a page outside the service cloud console may be silently allowed unless there exist dirty tabs that require saving. If there are dirty tabs then a warning may be displayed prior to the navigate that allows the user to cancel the navigation.

If the user navigates directly to the console URL without actually being in a console app, an error may be displaying asking the user to use the app dropdown to navigate to the console.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more implementations and techniques are described with reference to an implementation in which a service cloud console is implemented in a system having an application server providing a front end for an on-demand database service capable of supporting multiple tenants, the one or more implementations and techniques are not limited to multi-tenant databases nor deployment on application servers. Implementations may be practiced using other database architectures, i.e., ORACLE®, DB2® by IBM and the like without departing from the scope of the implementations claimed.

Bookmarkable URL's

Figure 9:
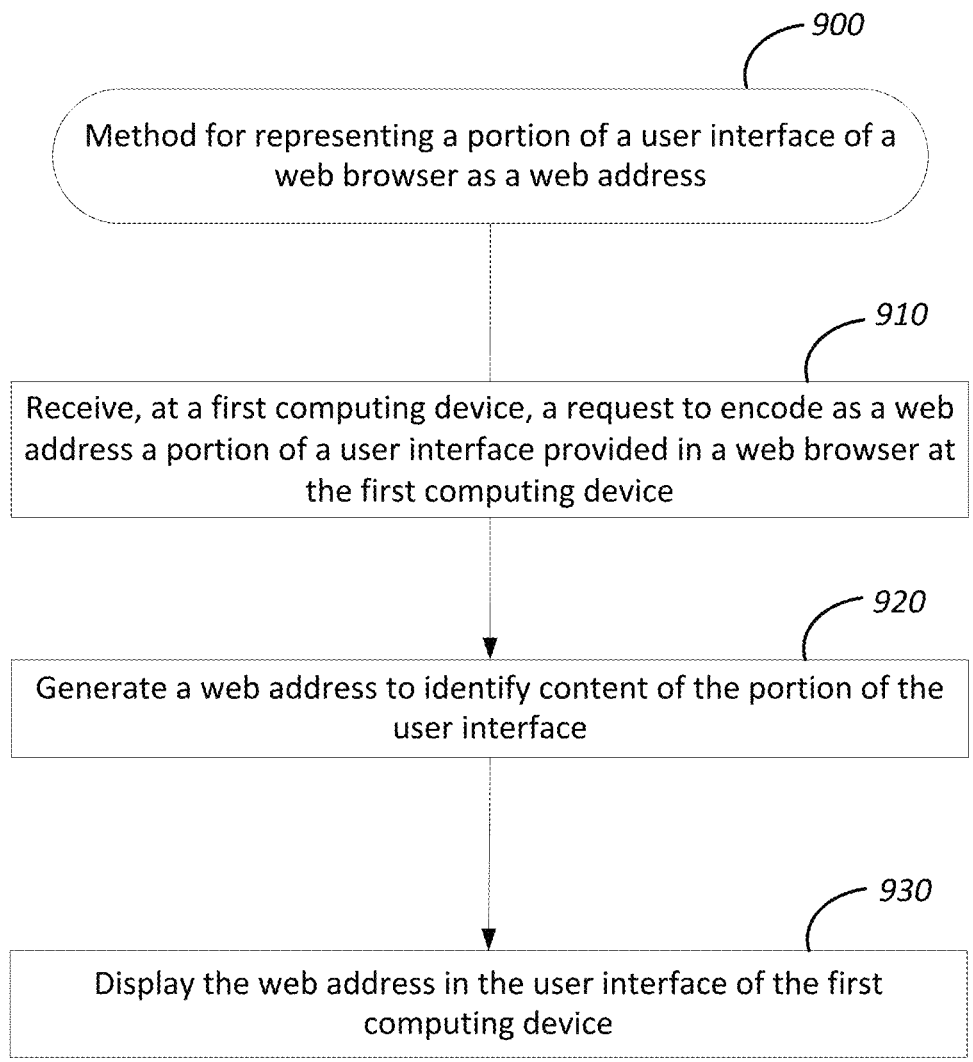
FIG. 9 shows a flowchart of an example of a computer implemented method 900 for representing a portion of a user interface in a web browser as a web address, in accordance with some implementations.

FIG. 9 shows a flowchart of an example of a computer implemented method 900 for representing a portion of a user interface in a web browser as a web address, in accordance with some implementations. FIG. 9 is described with reference to the examples of FIGS. 12-14.

In FIG. 9, at block 910, a first computing device receives a request to encode a portion of a user interface as a web address. The portion of the user interface being encoded may be displayed at the first computing device and includes a primary user interface component and one or more secondary user interface components, which are associated with the primary user interface component.

In some implementations, each of the secondary user interface components may only be displayed when its associated portion of the user interface, or workspace, is displayed. In other implementations, the primary user interface component displays information for a primary object record. A primary object record may be a user record, a case record, a lead record, a contact record, an external webpage, an incoming call, or the like. In some implementations, the secondary user interface component displays information for a secondary object record associated with the primary object record of the corresponding primary user interface component. In one implementation, the primary object record may be a user record for a customer that a customer service agent is assisting. The secondary object record may be a case associated with the customer, a troubleshooting article or search, or an external webpage. In some implementations, the primary object record is in a parent-child relationship with the secondary object records associated with it. For example, the primary object record may be a user record, and the secondary object records may be cases associated with the user record. The primary user interface component may be a primary tab containing user record information for the customer that the agent is assisting, and the secondary user interface component may be a secondary tab containing information for the case associated with the customer, or a secondary tab containing the troubleshooting information, or a secondary tab containing the external webpage. The primary tab may appear adjacent to the secondary tabs in the user interface. In some implementations, the primary tab may be the first listed tab adjacent to the secondary tabs of the user interface.

Figure 12:
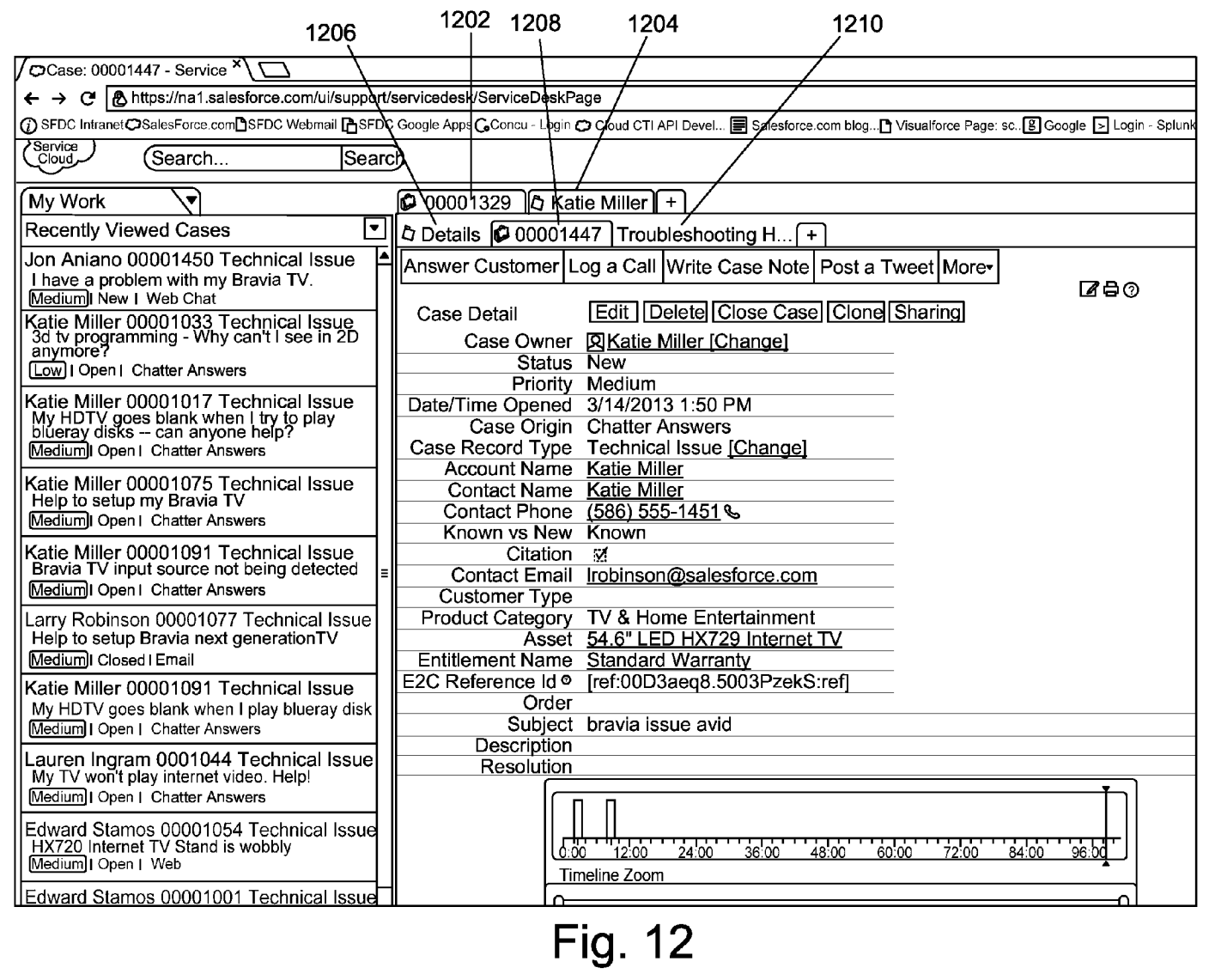

FIG. 12 shows an example of a graphical user interface (GUI) including a presentation of a primary user interface component and its associated secondary user interface components, in accordance with one or more implementations. FIG. 12 illustrates an example of a Service Console page where a workspace for "Katie Miller" is presented in a portion of the user interface 1204. Primary user interface component 1206 displays details and information stored in the "Katie Miller" user record. In some implementations, the primary user interface component containing the details of the user record of the primary user interface component is always displayed first or to the left of the secondary user interface components. A secondary user interface component 1208 displays a case record associated with the user record, and another secondary user interface component 1210 displays a troubleshooting article associated with the user record. In some implementations, another secondary user interface component may display an external webpage that is not a part of Service Console. In some implementations, the records displayed in the secondary user interface components 1208, 1210, may only be displayed when the associated user record is displayed in the primary user interface component 1204.

In some implementations, the portion of the user interface that is encoded in a web address includes a single primary tab identifying a user record and all of the secondary tabs associated with the primary tab, the secondary tabs containing case records, details pages, help pages, other Service Console pages, and external web pages. In the example of FIG. 12, the web address may represent the "Katie Miller" workspace by including the primary "Details" tab, the "00001447" case record in the secondary tab, and the "Troubleshooting" page in the other secondary tab.

In FIG. 9, at block 920, the computing device performing method 900 generates a web address to identify the content of the portion of the user interface identified in the request of block 910. In some implementations, the portion of the user interface may be a workspace of a customer service agent. The workspace that is encoded may include a primary tab and its associated secondary tabs. In other implementations, the portion of the user interface that is encoded may be a single primary tab or a single secondary tab.

Figure 14:
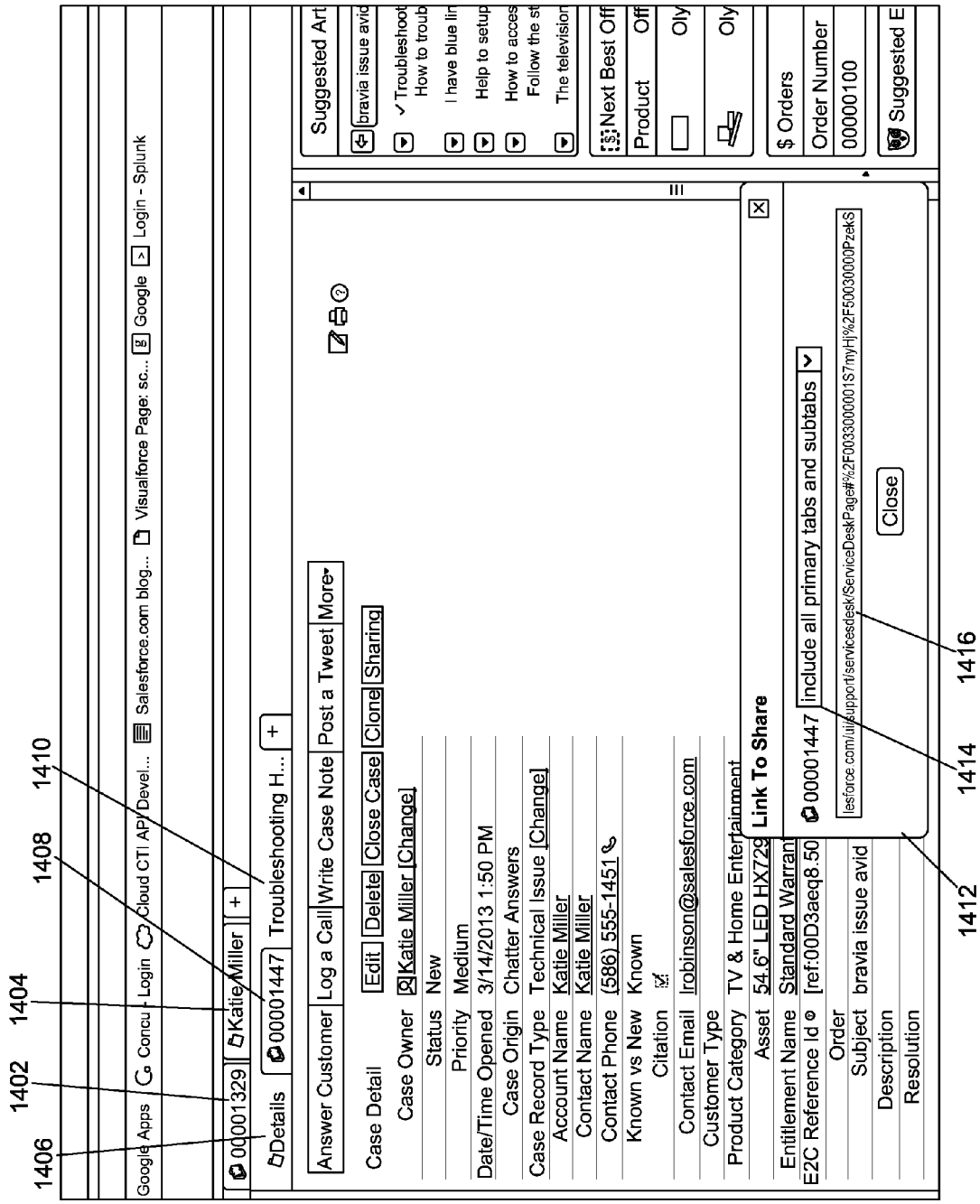
FIG. 14 shows an example of a GUI including a presentation of a primary user interface component and its associated secondary user interface components, in accordance with one or more implementations.

FIG. 14 shows an example of a GUI including a presentation of a primary user interface component and its associated secondary user interface components, in accordance with one or more implementations. FIG. 14 also depicts a "Link to Share" overlay 1412 that may appear when a user selects an option to share a workspace that is open in the user's user interface. The overlay may include a drop-down menu 1414 that allows a user to generate a link for the entire workspace, including the primary tab and the associated secondary tabs. The menu may also give the user the option to generate a link for only the selected primary or secondary tab. In some implementations, the menu may also allow a user to choose whether the generated web address is an absolute web address or a relative web address. An example of an absolute web address is the standard Salesforce URL, which may be entered in any web browser's URL bar. An example of a relative web address is a Service Console URL, which may be entered in the URL bar of a new Service Console webpage. Once the user selects one or more of the options in the drop-down menu 1414, a generated web address encoding the requested portion of the user interface appears in the web address bar 1416 of the overlay 1412.

The web address generated at block 920 may be formatted in any number of ways. In one implementation, the web address may be the following:

"https://prerelna1.pre.salesforce.com/ui/support/service-desk/ServiceDeskPag e#/003x0000002pTI6AAMI/ 500x0000000qUodAAEI/02ix00000005JNwAAM"

In this implementation, the web address begins with the URL of the Service Cloud Console, "https://prerelna1.pre.salesforce.com/ui/support/servicedesk/ServiceDeskPage". The Service Cloud Console URL is followed by a hash character (#), and three record identifiers, separated by a pipe character (|). The record identifiers—"/003x 0000002pTI6AAM", "/500x0000000qUodAAE", and "/02ix00000005JNwAAM"—correspond to the records displayed in the primary and secondary tabs of the workspace. In this implementation, the first identifier corresponds to the object record that is displayed in the primary tab, and the subsequent identifiers correspond to the secondary object records displayed in the secondary tabs, with the last identifier corresponding to the object record displayed in the focused secondary tab.

In some implementations, the workspace being encoded as a web address may include a secondary tab displaying an external webpage that is not hosted by the Service Cloud Console. For example, the website "bing.com" may be opened in one of the secondary tabs.

Figure 13:
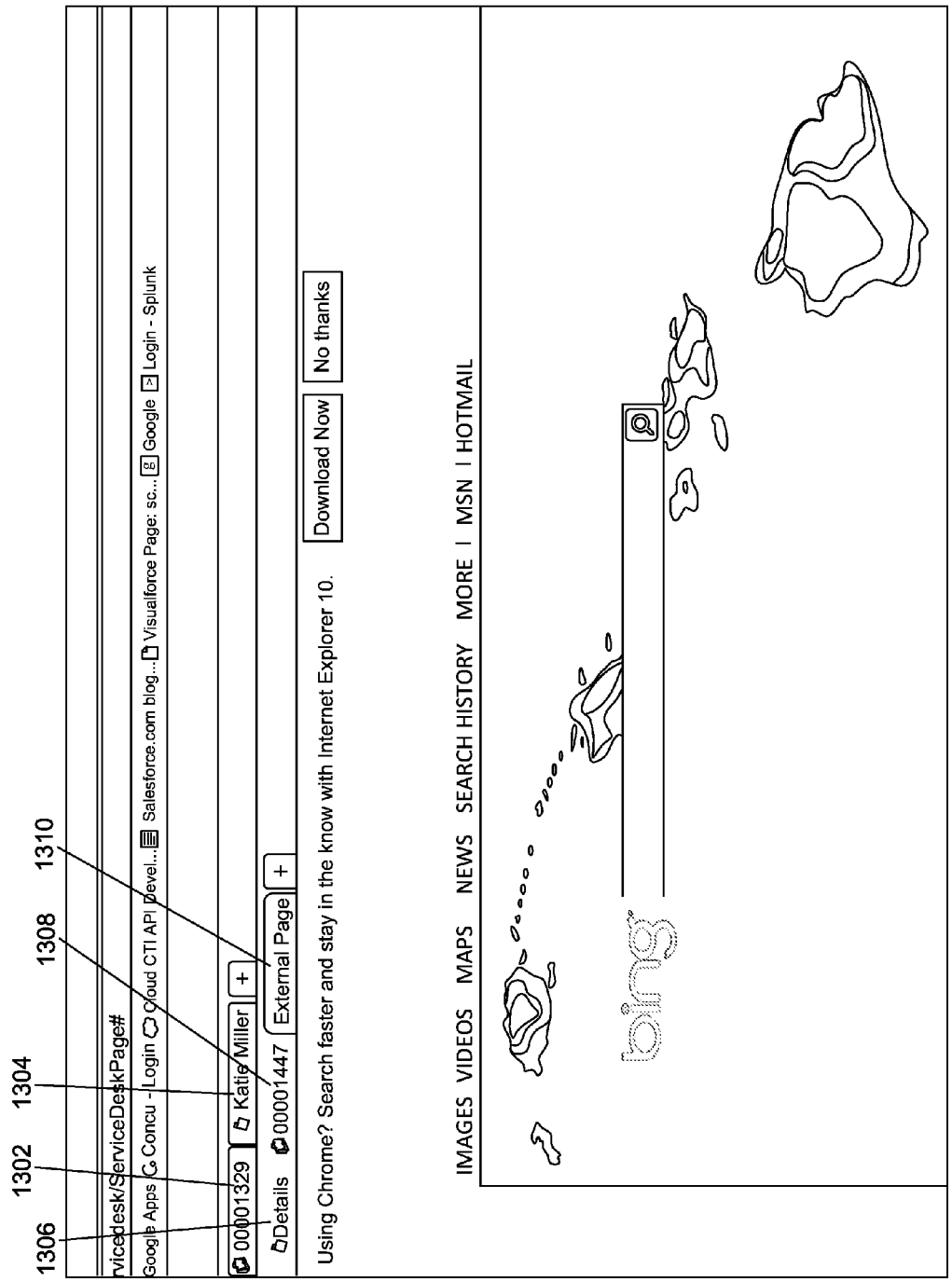
FIG. 13 shows an example of a GUI including a presentation of a primary user interface component and its associated secondary user interface components, wherein one of the secondary user interface components contains an external webpage, in accordance with one or more implementations.

FIG. 13 shows an example of a GUI including a presentation of a primary user interface component 1304 and its associated secondary user interface components, wherein one of the secondary user interface components contains an external webpage, in accordance with one or more implementations. In FIG. 13, the "Katie Miller" workspace 1304 is selected, and a primary tab 1306 for a "Details" page for the "Katie Miller" user record and secondary tabs 1308, 1310 for a "00001447" case record page and an "External Page" are open. In some implementations, an external webpage may only be presented in the user interface if it is one of a whitelist of authorized domains for external webpages. In some implementations, the server may maintain a whitelist of authorized domains on a database, such as the tenant data storage 422 or system data storage 424 of FIG. 4. The whitelist may contain web addresses, IP addresses, URL's, and the like, that may be displayed in primary or secondary tabs of the user interface. The whitelist may also contain web addresses of third-party applications and systems, such as a back office system, an inventory system, an audit system, or a finance system. In these implementations, a customer service agent may pull up external audit or finance or inventory records related to a customer case within the service console application. These external records may also be encoded in the web address, and in some implementations, the identifier corresponding to the external records may simply be the web address of the external record or any URL that is accessible in a web browser. For example, a workspace containing a secondary tab displaying bing.com may be represented by the web address:

"https://prerelna1.pre.salesforce.com/ui/support/service-desk/ServiceDeskPag e#/003x0000002pTI6AAMI/ 500x0000000qUodAAE|www.bing.com"

In another implementation, the server may maintain a blacklist of unauthorized domains for external webpages. In this implementation, an external webpage that is part of the blacklist of unauthorized domains will not be able to be opened in a tab of the service console application. Any external webpage that is not part of the blacklist may be opened in the service console application.

In some implementations, for the service console application to determine the web address of an external webpage that is displayed in one of the secondary tabs, the external webpage may execute an API call to the computing device to identify the external web address of the external webpage to the service console application. Once the external webpage has identified its external web address to the computing device, the service console application at the computing device may include the external web address as an identifier of the external webpage in the assembled web address representing the workspace.

In FIG. 9, at block 930, the computing device performing method 900 displays the web address in the user interface of the computing device.

In some implementations, as illustrated in FIG. 14, the web address may be displayed in the web address bar 1416 of the overlay 1412, allowing a user of the service console application to view or copy the web address to the clipboard and share it with another user. As an example, a customer service agent may wish to show another customer service agent the case that he is working on along with the other related records that he has opened while researching the case. After submitting the request to the computing device to encode the workspace as a web address and receiving the web address back displayed in the overlay 1412 of the user interface, the user may take the web address, copy it, and email it or instant message the web address over to the other customer service agent, who may click on the web address and open the workspace with all of the related records in his browser window.

As another example, a customer service agent may be working on a customer case, and he may have opened a number of related records while working on the case. He may have a customer record open in a primary tab, a related case record, and a related external third-party finance record open.

He may wish to bookmark this workspace and have a way to reopen all of these related records at a later time. In this example, he could save the web address displayed in the overlay 1412 as a bookmark in his browser. At a later time, he can open the bookmark, which will open his workspace with all of the related records open in the workspace.

Figure 10:
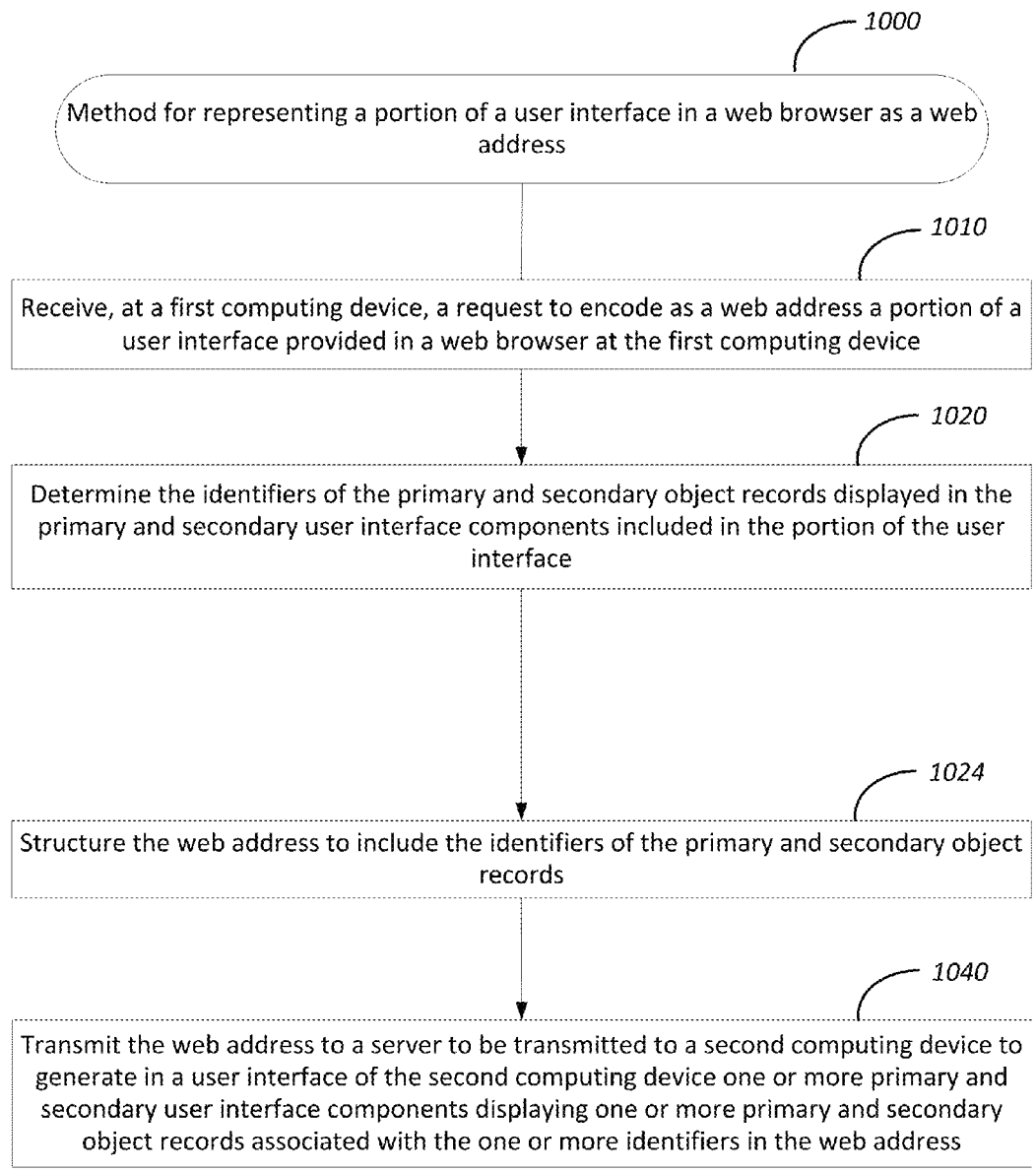
FIG. 10 shows a flowchart of an example of a computer implemented method 1000 for representing a portion of a user interface in a web browser as a web address, in accordance with some implementations.

FIG. 10 shows a flowchart of an example of a computer implemented method 1000 for representing a portion of a user interface in a web browser as a web address, in accordance with some implementations. FIG. 10 is described with reference to the examples of FIGS. 12-14.

In FIG. 10, at block 1010, a first computing device receives a request to encode a portion of a user interface as a web address. The portion of the user interface being encoded may be displayed at the first computing device and includes a primary user interface component and one or more secondary user interface components, which are associated with the primary user interface component, as generally described above at block 910 of method 900.

In some implementations, the portion of the user interface to be encoded includes a primary user interface component and the secondary user interface component associated with the primary user interface component. In some implementations, the primary user interface component may be the primary tab that is currently selected for display. In other implementations, the primary user interface component may be a primary tab that is not currently selected for display, but that the user selects. As an example, a user may have one customer record, say, "Katie Miller", selected for display, and the user may right-click on another customer record, say "John Smith", currently open in the user interface but not selected for display. Right-clicking on the other customer record could pop open a drop-down menu, in which one of the options may be "Share via Link". The user may click on the "Share via Link" option, sending to the server the request to encode the "John Smith" workspace.

In FIG. 10, at block 1020, the computing device performing method 1000 determines which primary and secondary user interface components are included in the portion of the user interface identified by the request. The computing device then determines which primary and secondary object records are displayed in those user interface components, then identifies the identifiers of those primary and secondary object records.

In some implementations, when a user triggers a request to encode a workspace, the default workspace to be encoded may be the workspace that is currently open and selected for display.

In some implementations, the identifiers for the primary and secondary object records that are displayed in the workspace to be represented by the web address are stored at the computing device. This way, determining the identifiers that are to be included in the web address may be performed by the computing device without communication with the server.

In FIG. 10, at block 1024, the computing device performing method 1000 structures the web address to include the identifiers of the primary and secondary object records that are open in the portion of the user interface, as described in block 920 of method 900 above.

In FIG. 10, at block 1040, the computing device performing method 1000 transmits the web address to a server to be transmitted to a second computing device. The second computing device may use the web address to generate in its user interface a workspace containing the same primary and secondary object records that were encoded by the web address at the first computing device. This may allow a first user to generate and share a workspace while working on a customer case.

As an example, a customer service agent, Agent 1, may receive an incoming call from a customer. When the call comes in, the customer record, identified by basic identifying information in the incoming call, may pop up in the Agent 1's user interface. As Agent 1 is speaking with the customer, Agent 1 may open a case record, search a knowledge database for a solution to the customer's problem, or look up billing information for the customer. At this point, Agent 1 may have identified the problem, but does not know how to resolve the problem, at which point Agent 1 may wish to transfer the case to a second customer service agent, Agent 2. In addition to transferring the case, Agent 1 may also wish to transfer his current workspace for the customer over to Agent 2, so that Agent 2 does not need to re-do all of the work that Agent 1 did in researching the case. Agent 1 may want Agent 2 to see the knowledge article that he was able to find in the knowledge database, and the billing information that is relevant to the customer's problem, without requiring Agent 2 to search for those records again. In this example, Agent 1 may transfer the call over to Agent 2. During the transfer, the server may receive a request to encode the workspace as a bookmarkable URL, as described above in block 910 of method 900. This generated bookmarkable URL may then be transmitted along with the call transfer to Agent 2 via the phone system that is transferring the call. In some implementations, when Agent 1 transfers the call to Agent 2, Agent 1 may be presented with an option to share the entire focused workspace, the focused primary record, another workspace, or another primary record. When Agent 2 receives the call transfer, Agent 2's service console application may also receive the bookmarkable URL that was packaged in with the call transfer, allowing it to display in Agent 2's user interface a workspace with the same records that Agent 1 had displayed in his user interface, allowing Agent 1 to essentially share his workspace with Agent 2. Without the bookmarkable URL, Agent 2 may otherwise only receive the same basic identifying information that Agent 1 received with the initial call.

In another example, Agent 1 may simply wish to send Agent 2 a bookmarkable URL representing his workspace without transferring the customer call to Agent 2. To accomplish this, Agent 1 may be presented with an option to share his workspace via a link, similar to other examples describe above, but Agent 1 may have the option of entering an email address or a social network contact so that the server generates the bookmarkable URL and transmits it to Agent 2 or another user directly via email or via social network messaging.

Figure 11:
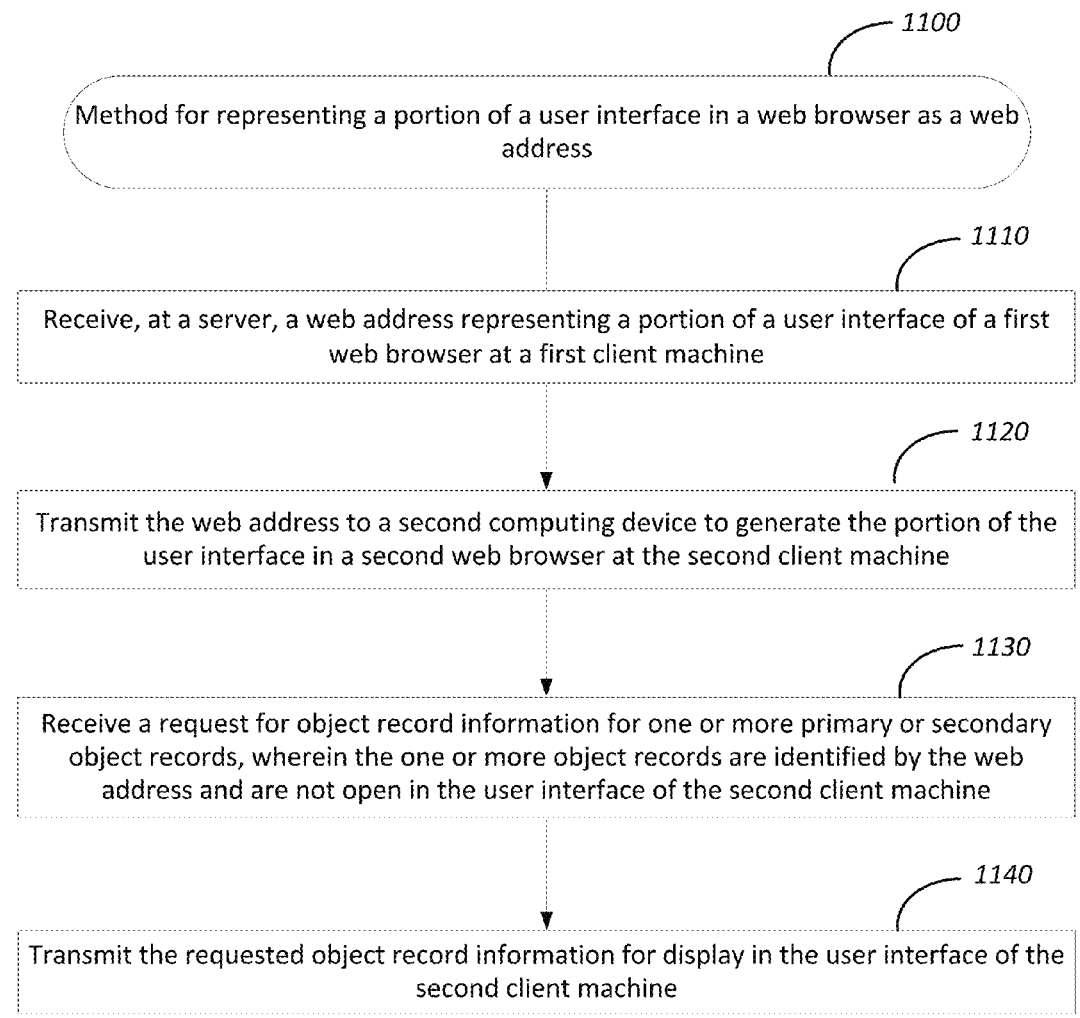
FIG. 11 shows a flowchart of an example of a computer implemented method 1100 for generating a portion of a user interface from a web address, in accordance with some implementations.

FIG. 11 shows a flowchart of an example of a computer implemented method 1100 for generating a portion of a user interface from a web address, in accordance with some implementations.

In FIG. 11, at block 1110, a server performing method 1100 receives a web address representing a portion of a user interface of a first web browser at a first client machine.

In some implementations, the web address is a bookmarkable URL generated by a first client machine, wherein the bookmarkable URL represents a workspace of a customer agent using the first client machine. The bookmarkable URL may have been generated in response to a request to transfer a customer call to a second customer agent and sent along with the call data to the server to be redirected to a second client machine of the second customer agent. In other implementations, the bookmarkable URL may have been sent via email, instant message, or a social media message to the server, to be delivered to a second client machine. In yet another implementation, the web address may be sent to the server to be stored in a database of the server for later retrieval by the first client machine or another client machine.

In FIG. 11, at block 1120, the server performing method 1100 transmits the web address to a second client machine to generate the portion of the user interface at the second client machine. The second client machine may use the web address to generate in its user interface a workspace containing the same primary and secondary object records that were encoded by the web address at the first client machine, as described in block 1040 of method 1000 above.

In FIG. 11, at block 1130, the server performing method 1100 receives a request for object record information for one or more primary and secondary object records, wherein the one or more object records are identified by the web address and are not open in the display of the second client machine.

In some implementations, when the second client machine receives bookmarkable URL, the second client machine may already have some of the primary or secondary object records identified by the bookmarkable URL open in its user interface. In order to avoid unnecessary server requests for object record information, the second client machine may not send a request to the server for the object record information for those currently displayed object records. However, in cases where the second client machine does not already have the primary or secondary object records identified by the web address open in its user interface, it may send a request to the server for the object record information of the primary and secondary object records that are identified by the web address and not currently open in the user interface of the second client machine.

In some implementations, as discussed above, when the second client machine receives the web address in block 1140, it may first determine which of the object records encoded in the web address are not currently open in the user interface of the second client machine. At block 1130, the server may receive a request from the second client machine for those object records that are not currently open in the user interface of the second client machine.

In some implementations, the bookmarkable URL may present the arguments of the URL in a hash structure, so that the webpage of the second client machine need not be completely reloaded. Using a hash structure in the bookmarkable URL may allow pages to load faster, may result in less load on the agent's browser, and may make the web pages more responsive. In an alternative implementation, the bookmarkable URL may also use a query string structure to present its arguments.

In some implementations, the request to the server for the object record information may made asynchronously with an AJAX call or any other kind of client-side technology known in the art.

In FIG. 11, at block 1140, the server performing method 1100 transmits the requested object record information for display in the user interface of the second client machine.

In some implementations, the server's response to the second client machine's asynchronous request contains object record information for object records not currently open in the second client machine's user interface. The second client machine, upon receiving the object record information, may then present the object records in a single workspace, wherein the resulting workspace contains all of the same records that were displayed in the workspace of the first client machine for which the bookmarkable URL was generated.

Returning to the example of Agent 1 and Agent 2 above, Agent 2 may already have the customer record open in his user interface, with a number of secondary records related to the customer record open as well. When Agent 2 receives the call transfer and the bookmarkable URL included in the call transfer, Agent 2's client machine may determine that the primary record encoded in the bookmarkable URL and the billing information record associated with the primary customer record is also already open in Agent 2's user interface. Agent 2's client machine may then send a request to the server for the knowledge article and the case record from Agent 1's workspace that are not currently open in Agent 2's workspace. When the server returns the object record information, Agent 2's client machine may open secondary tabs in the workspace to display the requested knowledge article and the requested case record.

In one implementation, if Agent 2's user interface includes secondary object records, such as another case record, that are not encoded in the bookmarkable URL, those secondary object records may remain in the user interface, such that Agent 2 may be presented with a workspace that is somewhat different from Agent 1's workspace that was encoded in the bookmarkable URL. In another implementation, the default procedure may be to close any secondary object records that are not included in the bookmarkable URL so that Agent 2's resulting workspace contains the same object records as Agent 1's workspace encoded by the bookmarkable URL.

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A method for representing a portion of a user interface associated with a web browser as a web address, the method comprising:

receiving a request to encode as a web address a portion of a user interface provided in association with a web browser at a display of a first computing device, the portion of the user interface having content including a primary user interface component and one or more secondary user interface components associated with the primary user interface component, the primary user interface component configured to include record information of a primary record stored in a database of a database system, the one or more secondary user interface components configured to include record information of one or more secondary records associated with the primary record, the one or more secondary records stored in a database of the database system;

generating a web address to identify the content of the portion of the user interface, the generated web address including a primary identifier identifying the primary record and including one or more secondary identifiers identifying the one or more secondary records; and causing the generated web address to be transmitted to a second computing device for processing to:
- identify the primary identifier and the one or more secondary identifiers of the generated web address,
- identify the primary record and the one or more secondary records using the primary identifier and the one or more secondary identifiers, and
- generate, using the identified primary record and the identified one or more secondary records, a presentation of the primary user interface component and the one or more secondary user interface components.

2. The method of claim 1, wherein each secondary user interface component is capable of being selected for display only when the associated portion of the user interface is selected for display.

3. The method of claim 1, wherein the first computing device generates the web address by:
- determining the identifiers of the primary and secondary records displayed in the primary and secondary user interface components included in the portion of the user interface; and
- structuring the web address to include the identifiers of the primary and secondary records associated with open primary and secondary user interface components.

4. The method of claim 3, wherein the identifiers included in the web address are separated with a dividing character or string.

5. The method of claim 1, wherein the primary and secondary records displayed in the primary and secondary user interface components are stored in a communicably accessible database of a server.

6. The method of claim 1, wherein one or more of the secondary records displayed in the secondary user interface components is an external webpage hosted on an external server, and wherein the identifier of the webpage is an external web address of the external webpage.

7. The method of claim 6, the method further comprising:
- receiving, at the first computing device, a request to identify to the first computing device the external web address of the external webpage displayed in a secondary user interface component, the request being an application programming interface (API) call from the external webpage; and
- storing the external web address of the external webpage at the first computing device.

8. The method of claim 6, wherein the webpage may be displayed in a secondary user interface component if the external web address of the external webpage appears in a list stored on a database of a server in communication with the first computing device.

9. The method of claim 1, wherein one or more of the secondary records displayed in the secondary user interface components is in a child-parent relationship with the primary record displayed in the respective primary user interface component.

10. The method of claim 1, wherein the user interface generated at the second computing device is the same as the user interface displayed at the first computing device.

11. The method of claim 1, wherein the transmission of the web address occurs over a telephone system line.

12. The method of claim 1, wherein the request to encode the portion of the user interface is generated by a first customer service agent at the first computing device, and wherein a second customer service agent at the second computing device is presented with the generated user interface of the second computing device.

13. The method of claim 1, the method further comprising:
displaying the web address in the user interface of the first computing device.

14. The method of claim 1, wherein the request to encode the portion of the user interface is associated with an application programming interface (API) call at the first computing device.

15. A system comprising:
a database system storing a plurality of records as data objects; and
one or more servers having one or more processors operable to cause:
- processing a web address encoded to identify content of a portion of a user interface provided in association with a web browser at a display of a first computing device, the content including a primary user interface component and one or more secondary user interface components associated with the primary user interface component, the primary user interface component configured to include record information of a primary record stored in a database of the database system, the one or more secondary user interface components configured to include record information of one or more secondary records associated with the primary record, the one or more secondary records stored in a database of the database system, the encoded web address including a primary identifier identifying the primary record and including one or more secondary identifiers identifying the one or more secondary records; and
- sending the encoded web address to a second computing device for processing to:
  - identify the primary identifier and the one or more secondary identifiers of the web address,
  - identify the primary record and the one or more secondary records using the primary identifier and the one or more secondary identifiers, and
  - generate, using the identified primary record and the identified one or more secondary records, a presentation of the primary user interface component and the one or more secondary user interface components.

16. A computer program product comprising program code to be executed by at least one processor when retrieved from a non-transitory computer-readable medium, the program code comprising instructions configured to cause:
processing, at a server associated with a database system, a web address encoded to identify content of a portion of a user interface provided in association with a web browser at a display of a first computing device, the content including a primary user interface component and one or more secondary user interface components associated with the primary user interface component, the primary user interface component configured to include record information of a primary record stored in a database of the database system, the one or more secondary user interface components configured to include record information of one or more secondary records associated with the primary record, the one or more secondary records stored in a database of the database system, the encoded web address including a primary identifier identifying the primary record and including one or more secondary identifiers identifying the one or more secondary records; and sending the encoded web address to a second computing device for processing to:
  identify the primary identifier and the one or more secondary identifiers of the web address,
  identify the primary record and the one or more secondary records using the primary identifier and the one or more secondary identifiers, and
  generate, using the identified primary record and the identified one or more secondary records, a presentation of the primary user interface component and the one or more secondary user interface components.

17. The computer program product of claim 16, the instructions further configured to cause:
receiving, at the server, a request for record information for one or more primary or secondary records, wherein the one or more primary or secondary records are identified by the web address and are not open in the user interface of the second client machine; and
transmitting the requested record information for display in the user interface of the second client machine.

18. The computer program product of claim 17, wherein the primary and secondary records displayed in the primary and secondary user interface components are stored in a communicably accessible database of the server.

19. The computer program product of claim 16, wherein the web address includes the primary and secondary records of the portion of the user interface, the identifiers separated with a dividing character or string.

20. The computer program product of claim 16, wherein one or more of the secondary records displayed in the secondary user interface components is hosted in the form of a webpage on an external server, and wherein the identifier of the webpage is an external web address of the webpage.

* * * * *